(12) United States Patent
Kurokawa et al.

(10) Patent No.: US 11,400,540 B2
(45) Date of Patent: Aug. 2, 2022

(54) DIFFERENT MATERIAL JOINING METHOD

(71) Applicant: TOYOTA JIDOSHA KABUSHIKI KAISHA, Toyota (JP)

(72) Inventors: Shotaro Kurokawa, Nagakute (JP); Shuhei Ogura, Nagakute (JP); Atsushi Kawakita, Miyoshi (JP); Keisuke Shinohara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 16/572,936

(22) Filed: Sep. 17, 2019

(65) Prior Publication Data

US 2020/0130098 A1  Apr. 30, 2020

(30) Foreign Application Priority Data

Oct. 31, 2018 (JP) .............................. JP2018-204708

(51) Int. Cl.
*B23K 11/11* (2006.01)
*B21J 15/08* (2006.01)
(Continued)

(52) U.S. Cl.
CPC ............. *B23K 11/115* (2013.01); *B21J 15/08* (2013.01); *B23K 11/20* (2013.01); *B23K 2103/02* (2018.08); *B23K 2103/10* (2018.08)

(58) Field of Classification Search
CPC .... B21J 15/08; B23K 11/0066; B23K 11/115; B23K 11/20; B23K 2103/02; B23K 2103/10; B23K 2103/20
(Continued)

(56) References Cited

U.S. PATENT DOCUMENTS

2016/0067913 A1  3/2016  Draht et al.
2016/0123362 A1*  5/2016  Iwase .................. F16B 5/08
411/82

FOREIGN PATENT DOCUMENTS

CN  103056522  *  4/2013
CN  105121086 A  12/2015
(Continued)

OTHER PUBLICATIONS

Combined Chinese Office Action and Search Report dated Mar. 26, 2021 in Chinese Patent Application No. 201911005234.4 (submitting partial English translation only), 9 pages.
(Continued)

*Primary Examiner* — Dana Ross
*Assistant Examiner* — Joseph W Iskra
(74) *Attorney, Agent, or Firm* — Oblon, McClelland, Maier & Neustadt, L.L.P.

(57) ABSTRACT

An iron rivet including a head and a shank, an aluminum plate, an iron plate, and first and second electrodes are prepared. A sandwiching step of sandwiching the rivet, the aluminum plate, and the iron plate between the first electrode and the second electrode, a penetration step of performing pressurization and current application by the first and second electrodes so that the shank penetrates through the aluminum plate, and a forming step of performing pressurization and current application by the first and second electrodes so that a nugget is formed between the shank and the iron plate are included. In the penetration step, the pressurization and current application is performed while air is blown to a side face of the shank so that the air hits a region around a boundary between the shank and the aluminum plate.

12 Claims, 31 Drawing Sheets

(51) Int. Cl.
*B23K 11/20* (2006.01)
*B23K 103/10* (2006.01)
*B23K 103/02* (2006.01)

(58) Field of Classification Search
USPC .......................................................... 219/157
See application file for complete search history.

(56) References Cited

FOREIGN PATENT DOCUMENTS

| | | |
|---|---|---|
| CN | 105190059 A | 12/2015 |
| JP | 9-201679 A | 8/1997 |
| JP | 2015-42417 A | 3/2015 |
| JP | 6255600 B1 | 1/2018 |

OTHER PUBLICATIONS

Shi Ping-an, et al., "Simulation and experimental study on fluid dynamics behavior of welding pool and keyhole in laser welding process", Transactions of Materials and Heat Treatment, vol. 38, No. 8. Aug. 2017, pp. 134-144 (with English abstract).

* cited by examiner

Vg < Vp

Vg < Vp

Vg' > Vp'

DIFFERENT MATERIAL JOINING METHOD

INCORPORATION BY REFERENCE

The disclosure of Japanese Patent Application No. 2018-204708 filed on Oct. 31, 2018 including the specification, drawings and abstract is incorporated herein by reference in its entirety.

BACKGROUND

1. Technical Field

The disclosure relates to a different material joining method for joining a plurality of metal members including a dissimilar metal member by resistance welding by use of a rivet.

2. Description of Related Art

There has been known a different material joining method for joining dissimilar metal members by resistance welding by use of a metal rivet including a head and a shank. In this different material joining method, the rivet, an aluminum plate, and an iron plate are sandwiched between two electrodes so that the head, the shank, the aluminum plate, and the iron plate are arranged in this order, for example, and they are subjected to pressurization and current application so as to form a nugget between the shank penetrating through the aluminum plate and the iron plate such that the aluminum plate is sandwiched between the head and the iron plate. Thus, the aluminum plate is joined to the iron plate.

However, the different material joining method has such a problem that, when molten aluminum spouts out, the head of the rivet does not sufficiently make close contact with the aluminum plate, so that the joining strength decreases, or solidified aluminum remains as a so-called burr.

In view of this, for example, Japanese Patent No. 6255600 (JP 6255600 B) discloses such a technology that molten aluminum is moved into a groove space by use of a connecting member (a rivet) including a flat-shaped body portion (a head), a pilot portion (a shank) projecting from the body portion, and an annular wall provided in the outer periphery of the body portion. The connecting member is configured such that the volume of the groove space formed between the pilot portion and the annular wall is set to be larger than the volume of a part, of the pilot portion, that projects from the groove space.

SUMMARY

In the technology disclosed in JP 6255600 B, by moving the molten aluminum into the groove space, it is possible to restrain the molten aluminum from spouting out to some extent.

However, in the technology disclosed in JP 6255600 B, when a large amount of heat is applied to enlarge the nugget, the molten aluminum that has moved to the groove space reaches a high temperature and expands, and the molten aluminum thus expanding spouts outside from the groove space, so that a burr might be formed. The technology of JP 6255600 B has room for improvement in this respect.

Here, it is also conceivable that the groove space is enlarged in order to restrain the molten aluminum from spouting out. However, in this case, the rivet itself becomes large, and this causes such a problem that its outward appearance becomes poor or its yield decreases.

The disclosure relates to a different material joining method for joining dissimilar metal members by resistance welding by use of a rivet and provides a technology to restrain the occurrence of a burr in a joining portion without upsizing a rivet.

In a different material joining method according to this disclosure, pressurization and current application is performed while molten metal is blown off with air.

More specifically, the different material joining method is targeted for a different material joining method for joining a plurality of metal members by resistance welding by use of a rivet.

In the different material joining method, a metal rivet including a head and a shank, first to nth metal members, and first and second electrodes are prepared. Here, n is an integer of 2 or more, and the first metal member is made of a material different from at least one of the second to nth metal members.

The different material joining method includes: a sandwiching step of sandwiching, between the first electrode and the second electrode, the rivet and the first to nth metal members arranged in order of the head, the shank, and the first to nth metal members; a penetration step of performing pressurization and current application on the rivet and the first to nth metal members by the first and second electrodes so that the shank penetrates through the first to (n−1)th metal members; and a forming step of performing pressurization and current application on the rivet and the first to nth metal members by the first and second electrodes so that a nugget is formed between the shank and the nth metal member. In the penetration step, the pressurization and current application is performed while air is blown to a side face of the shank so that the air hits a region around a boundary between the shank and the first metal member.

In the penetration step, when the shank is pushed into the first metal member melted by the pressurization and current application, molten metal replaced with the shank spouts out from the boundary between the shank and the first metal member. However, in this configuration, the pressurization and current application is performed while the air is blown to the side face of the shank so that the air hits the region around the boundary, thereby making it possible to sequentially blow off the molten metal spouting out from the boundary.

Further, since the air is blown to the side face of the shank, in other words, the air is blown from a direction parallel to a plane perpendicular to the shank or a direction inclined from the plane perpendicular to the shank, it is possible to blow off the molten metal more effectively as compared to a case where the air is blown from the extending direction (the axial direction) of the shank, for example.

Accordingly, it is possible to remove the molten metal from the vicinity of a joining portion, thereby making it possible to restrain the occurrence of a burr in the joining portion without upsizing the rivet. Besides, by removing the molten metal, the head of the rivet can make close contact with the first metal member (no burr is sandwiched between the head of the rivet and the first metal member), thereby making it possible to improve the joining strength.

Note that, in the disclosure, "a plurality of metal members including a dissimilar metal member" includes a case where all of the metal members are dissimilar metal members, a case where the metal members include at least two types of metal members, and so on.

In the meantime, a generation amount of the molten metal in the forming step is small in comparison with the penetration step in which the first to (n−1)th metal members are replaced with the shank. However, when a large amount of heat is applied to enlarge the nugget in order to increase the joining strength, for example, the first to (n−1)th metal members around the shank might also melt and spout out in the forming step. In such a case, in a rivet in which a head that does not have a groove, the molten metal might spout out from a boundary between the head and the first metal member. Meanwhile, in a rivet in which a head has a groove, although the molten metal is accommodated in the groove, the molten metal in the groove might expand due to a large amount of heat and spout outside from the groove.

In view of this, in the forming step, the pressurization and current application may be performed while the air is blown to a side face of the head so that the air hits a region around a boundary between the head and the first metal member.

In this configuration, in a case where a groove in which molten metal is to be accommodated is not formed in the head, for example, the air is blown to the side face of the head so that the air hits the region around the boundary between the head and the first metal member, thereby making it possible to blow off the molten metal spouting out from the boundary.

In the meantime, in a case where a groove in which molten metal is to be accommodated is formed in the head, for example, the molten metal is cooled by blowing the air to the side face of the head. Accordingly, it is possible to restrain expansion of the molten metal in the groove, thereby making it possible to restrain the molten metal from spouting outside from the groove. Further, since the air is blown to the side face of the head so that the air hits the region around the boundary between the head and the first metal member, even if the molten metal spouts outside from the groove, it is possible to blow off the molten metal spouting out from the boundary.

In the meantime, in order to increase the joining strength, it is effective to enlarge the nugget as described above, and it is also effective to form, in the head, a groove in which molten metal is to be accommodated. A reason thereof is as follows: when the molten metal accommodated in the groove solidifies, the sectional area in the shearing direction increases, so that the shear strength of the joining portion increases. However, if the molten metal is not filled into the groove, in other words, if a void is formed in the groove, the improvement of the joining strength cannot be expected.

In view of this, the rivet may be configured such that the head includes an annular wall projecting in the same direction as the shank so that an annular groove is formed around the shank, and the volume of the annular groove is smaller than the volume of a pilot portion of the shank, the pilot portion projecting from the annular wall. At least in the penetration step, an air flow rate may be controlled so that molten metal is filled into the annular groove.

In this configuration, by controlling the air flow rate, it is possible to adjust the amount of the molten metal to be blown off in the penetration step. Here, the volume of the pilot portion is generally equal to a part, of the shank, the part penetrating through the first to (n−1)th metal members. In this configuration, the volume of the annular groove is smaller than the volume of the pilot portion, in other words, the volume of the annular groove is smaller than the volume of the molten metal replaced with the shank and spouting out. Accordingly, the molten metal can be easily filled into the annular groove through the control of the air flow rate. Accordingly, it is possible to increase the shear strength and to improve the joining strength.

Besides, when the volume of the annular groove is set to be relatively small and the pressurization and current application is performed with the air being blown to the side face of the rivet, the molten metal filled in the annular groove and overflowing from the annular groove can be blown off, thereby making it possible to restrain the occurrence of a burr in the joining portion without upsizing the rivet.

Further, the projection height of the annular wall may be relatively low.

When the projection height of the annular wall is relatively high, in other words, when the distance between a distal end of the annular wall and the first metal member is small, metal blown off might be sandwiched between the distal end of the annular wall and the first metal member or the air thus blown might hit the annular wall so that the loss of the air becomes large. In this respect, in the disclosure, since the volume of the annular groove is set to be relatively small, the projection height of the annular wall can be set to be relatively low. Accordingly, it is possible to restrain such a situation that metal is sandwiched between the distal end of the annular wall and the first metal member or the loss of the air increases.

In the meantime, when the shank penetrates through the metal member at a high current, the metal melts and a burr is formed. Accordingly, a different material joining method in the related art employs a technique in which the metal member is softened at a low current (less than 80% of a current value at the time of forming a nugget, for example) so that the shank penetrates through the metal member. However, in this technique, instead of the molten metal being replaced with the shank and spouting out, the first to (n−1)th metal members thus softening are pushed out to the backside (the nth metal member side) by the rivet, and an electric current path expands, so that the current value necessary to form the nugget increases, thereby resulting in that poor welding might be caused (a nugget might be formed poorly).

In view of this, a first initial current value at the time when the pressurization and current application is started in the penetration step may be not less than 0.8 times a second initial current value at the time when the pressurization and current application is started in the forming step.

In this configuration, the pressurization and current application in the penetration step is started at a relatively high initial current value that is not less than 0.8 times the second initial current value at the time when the pressurization and current application is started in the forming step. Accordingly, the first to (n−1)th metal members are melted actively, so that the first to (n−1)th metal members are not pushed out to the backside by the rivet, thereby making it possible to restrain expansion of the electric current path. Besides, the metal melted at the high initial current value is blown off with the air, so that it is possible to restrain the occurrence of a burr in the joining portion and to restrain such a situation that a nugget is formed poorly.

Further, in the forming step, downslope current application in which the current value is gradually decreased from the second initial current value may be performed.

A high current value is preferable in an early stage in the formation of a nugget in the forming step. With this configuration, due to the initial current value set to be relatively high, for example, it is possible to restrain such a situation that a nugget is formed poorly, and due to a temperature decrease along with the downslope current application, it is possible to restrain such a situation that a large amount of the molten metal spouts out in a later stage of the forming step.

Further, the current value in the pressurization and current application in the penetration step may be not less than the current value in the pressurization and current application in the forming step.

In this configuration, the pressurization and current application in the penetration step is performed at a further high current value that is not less than the current value in the pressurization and current application in the forming step. Hereby, the first to (n−1)th metal members can be melted more actively. Accordingly, it is possible to shorten the penetration step, to restrain the occurrence of a burr in the joining portion, and to form an excellent nugget.

Further, in the penetration step, the air may be blown from two or more directions so as not to form a region that is not hit by the air around the boundary between the shank and the first metal member.

When the air is blown from one direction, a region that is not hit by the air may be formed on a side opposite from the air-blown side across the shank. In this case, a burr is easily formed in the region. In this configuration, the air is blown from two or more directions so as not to form the region that is not hit by the air around the boundary. Accordingly, it is possible to more surely blow off the molten metal.

Further, in the penetration step, first air may be blown toward an axial center of the shank, and second air may be blown toward the axial center of the shank from the direction having an angle of not less than 30 degrees but not more than 330 degrees from a blowing direction of the first air when the shank is viewed along the axial direction of the shank.

In this configuration, it is possible to blow off the molten metal over a whole circumference of the shank without forming the region that is not hit by the air around the boundary, by the first air blown toward the axial center of the shank and the second air blown toward the axial center of the shank from the direction having an angle of not less than 30 degrees but not more than 330 degrees from the blowing direction of the first air when the shank is viewed along the axial direction.

Further, in the penetration step, first air may be blown toward an axial center of the shank, and second air may be blown toward the region that is not hit by the first air when the shank is viewed along the axial direction of the shank.

In this configuration, the second air is blown toward the region that is not hit by the first air in a pinpoint manner, so that it is possible to surely blow off the molten metal, thereby making it possible to further restrain the occurrence of a burr in the joining portion.

As described above, with the different material joining method of the disclosure, it is possible to restrain the occurrence of a burr in a joining portion without upsizing a rivet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, the following describes embodiments to carry out the disclosure.

First Embodiment

Figure 1A:
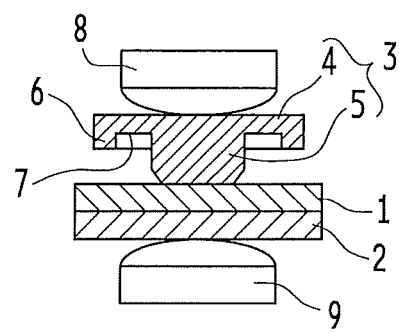
FIG. 1A is a view to schematically describe a sandwiching step in a different material joining method according to a first embodiment of the disclosure.
Figure 1B:
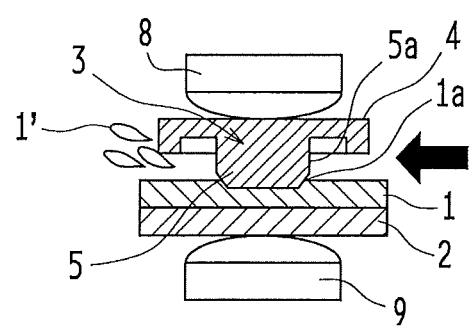
FIG. 1B is a view to schematically describe a penetration step in the different material joining method.
Figure 1C:
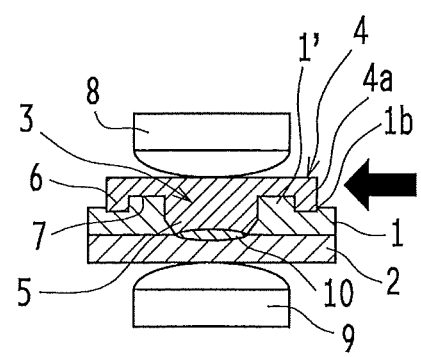
FIG. 1C is a view to schematically describe a forming step in the different material joining method.

FIG. 1A is a view to schematically describe a sandwiching step in a different material joining method according to the present embodiment, FIG. 1B is a view to schematically describe a penetration step, and FIG. 1C is a view to schematically describe a forming step. In this different material joining method, a plurality of metal members including a dissimilar metal member is joined by resistance welding by use of a rivet 3, as illustrated in FIGS. 1A to 1C.

First, in this different material joining method, the rivet 3, first to nth metal members (n is an integer of 2 or more) including a dissimilar metal member, and first and second electrodes 8, 9 are prepared.

As the rivet 3, an iron rivet including a head 4 and a shank 5 is prepared as illustrated in FIG. 1A. The shank 5 is formed in a columnar shape and projects in one direction from the central part of the head 4 formed into a disk shape. Further, an annular wall 6 projecting in the same direction as the shank 5 is provided over a whole circumference of an outer peripheral edge of the head 4, and hereby, an annular groove 7 sectioned by an outer peripheral surface of the shank 5, one surface of the head 4, and an inner peripheral surface of the annular wall 6 is formed around the shank 5.

As the first to nth metal members including a dissimilar metal member, an aluminum plate (the first metal member) 1 and an iron plate (the nth metal member) 2 are prepared. Note that, in the present embodiment, the rivet 3 and the nth metal member are both made of iron, but the rivet 3 and the nth metal member may not necessarily be the same metal members. In the present specification, the aluminum plate includes a plate material made of aluminum alloy as well as a plate material made of aluminum.

The different material joining method of the present embodiment includes the sandwiching step illustrated in FIG. 1A, the penetration step illustrated in FIG. 1B, and the forming step illustrated in FIG. 1C.

First, in the sandwiching step, as illustrated in FIG. 1A, in a state where the head 4, the shank 5, the aluminum plate 1, and the iron plate 2 are arranged in this order, in other words, the shank 5 of the rivet 3 is perpendicularly brought into contact with the aluminum plate 1 put on the iron plate 2, the rivet 3, the aluminum plate 1, and the iron plate 2 are sandwiched between the first electrode 8 and the second electrode 9 of a resistance spot welder (not shown).

Subsequently, the rivet 3, the aluminum plate 1, and the iron plate 2 are subjected to pressurization and current application so as to form a nugget 10 between the iron plate 2 and the shank 5 penetrating through the aluminum plate 1 and sandwich the aluminum plate 1 between the head 4 and the iron plate 2, thereby joining the aluminum plate 1 to the iron plate 2. For easy understanding of the present embodiment, prior to the description of the penetration step and the forming step, a different material joining method of a first related art will be described.

Figure 16A:
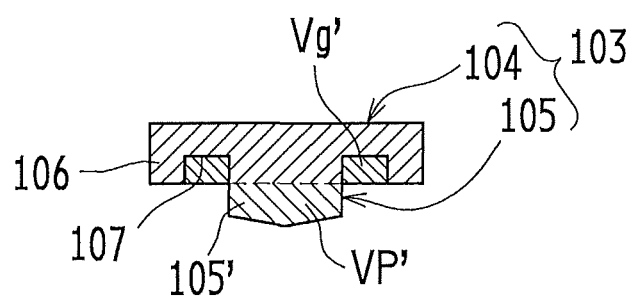
FIG. 16A is a view schematically illustrating a rivet to be use in a different material joining method of a first related art.
Figure 16B:
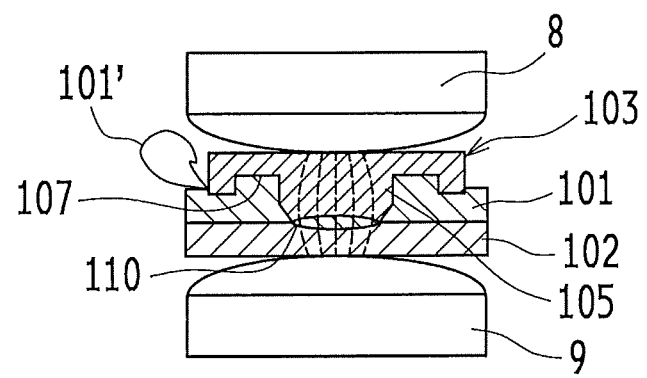
FIG. 16B is a view to schematically describe the different material joining method of the first related art.
Figure 16C:
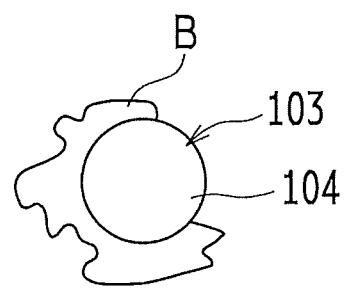
FIG. 16C is a view schematically illustrating a joining portion to be formed by the different material joining method of the first related art.

FIG. 16A is a view schematically illustrating a rivet 103 to be used in the different material joining method of the first related art, FIG. 16B is a view to schematically describe the different material joining method of the first related art, and FIG. 16C is a view schematically illustrating a joining portion to be formed by the different material joining method of the first related art. In a different material joining method for joining dissimilar metal members by resistance welding by use of a rivet, a shank of the rivet is caused to penetrate through an aluminum plate, so that molten aluminum replaced with the shank often spouts out from a boundary between the shank and the aluminum plate. When the molten aluminum spouts out as such, such a problem occurs that solidified aluminum remains as a so-called burr.

In view of this, in the different material joining method of the first related art, an aluminum plate 10I is joined to an iron plate 102 by resistance welding by use of a rivet 103 as illustrated in FIG. 16A. The rivet 103 includes a head 104 and a shank 105. In the rivet 103, an annular wall 106 is provided over a whole circumference of an outer peripheral edge of the head 104, so that an annular groove 107 is formed around the shank 105. In the rivet 103, when a part, of the shank 105, that projects from the annular wall 106 is defined as a pilot portion 105', the dimension of each portion is determined so that a volume Vg' of the annular groove 107 is not less than a volume Vp' of the pilot portion 105'. As such, in the different material joining method of the first related art, by use of the rivet 103 in which the volume Vg' of the annular groove 107 is set to be not less than the volume Vp' of the pilot portion 105', the spout of the molten aluminum 101' is restrained by moving molten aluminum 101' to the annular groove 107.

However, in the different material joining method of the first related art, when a large amount of heat is applied to enlarge a nugget 110 in order to increase the joining strength, the molten aluminum 101' that has moved to the annular groove 107 reaches a high temperature and expands, so that the molten aluminum 101' thus expanding might spout outside from the annular groove 107, as illustrated in FIG. 16B. Therefore, as illustrated in FIG. 16C, in the different material joining method of the first related art, the molten aluminum 101' thus spouting outside from the annular groove 107 might solidify to cause a burr B around the rivet 103.

Here, it is also conceivable that the annular groove 107 is made large in order to restrain the spout of the molten aluminum 101', but in this case, the rivet 103 itself becomes large, and this causes such a problem that its outward appearance becomes poor or its yield decreases.

In view of this, in the different material joining method of the present embodiment, pressurization and current application is performed while molten aluminum is blown off with air.

More specifically, in the penetration step, as illustrated in FIG. 1B, the rivet 3, the aluminum plate 1, and the iron plate 2 are subjected to pressurization and current application in such a manner that the first electrode 8 and the second electrode 9 are made come close to each other so that a welding pressure is applied to the head 4 of the rivet 3 and the iron plate 2, and a pulse current is applied between the first and second electrodes 8, 9, and hereby, the aluminum plate 1 is melted by generated Joule heat so that the shank 5 penetrates through the aluminum plate 1. At this time, as indicated by a black arrow in FIG. 1B, the pressurization and current application is performed while the air is blown from an air blow nozzle (not shown) to a side face 5a of the shank 5 (while air blow is performed) so that the air (compressed air) hits a region around a boundary 1a between the shank 5 and the aluminum plate 1.

As such, in the penetration step, the pressurization and current application is performed while the air is blown to the side face 5a of the shank 5 so that the air hits the region around the boundary 1a between the shank 5 and the aluminum plate 1. Hereby, molten aluminum 1' replaced with the shank 5 and spouting out from the boundary 1a can be blown off sequentially.

Figure 2A:
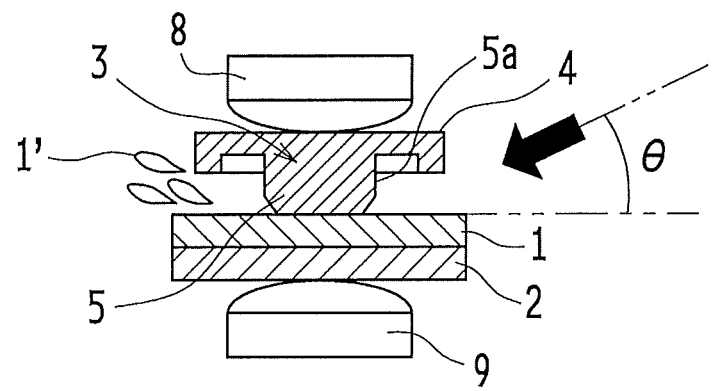
FIG. 2A is a view schematically illustrating an example of air blow.

Note that, in the present embodiment, the air should be blown to the side face 5a of the shank 5 so that the air hits the region around the boundary 1a so as to blow off the molten aluminum 1' spouting out from the boundary 1a. Accordingly, the air may be blown from a direction parallel to a surface, of the aluminum plate 1, that is perpendicular to the shank 5 as illustrated in FIG. 1B, or the air may be blown from a direction inclined by an angle θ from the surface, of the aluminum plate 1, that is perpendicular to the shank 5 as illustrated in FIG. 2A.

Figure 2B:
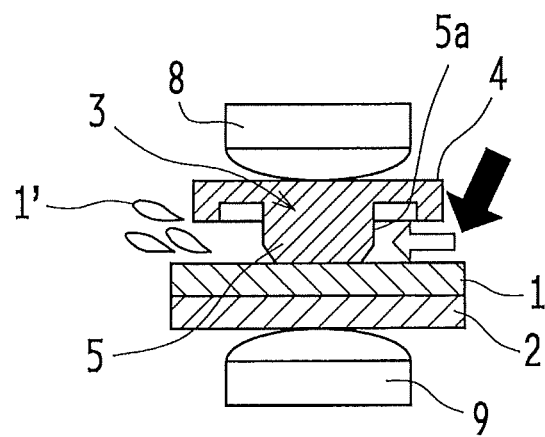
FIG. 2B is a view schematically illustrating an example of the air blow.

Further, the air should be blown to the side face 5a of the shank 5 so that the air hits the region around the boundary 1a, and the air may not necessarily be directly blown to the side face 5a of the shank 5. For example, the air may hit the surface of the aluminum plate 1 once as indicated by a black arrow in FIG. 2B, and the air bouncing off from the surface may be blown to the side face 5a of the shank 5 as indicated by a white arrow in FIG. 2B, that is, the air may be blown to the side face 5a indirectly.

As such, since the air is blown to the "side face 5a" of the shank 5, in other words, the air is blown from a direction parallel to a plane perpendicular to the shank 5 or a direction inclined from the plane perpendicular to the shank 5, it is possible to blow off the molten aluminum 1' more effectively as compared to a case where the air is blown from the extending direction (the axial direction) of the shank 5, for example.

In the meantime, a generation amount of the molten aluminum 1' in the forming step is small in comparison with that in the penetration step in which the aluminum plate 1 is replaced with the shank 5, but when a large amount of heat is applied to enlarge the nugget 10 in order to increase the joining strength, for example, the aluminum plate 1 around the shank 5 might also melt and spout out in the forming step. In such a case, although the molten aluminum 1' is accommodated in the annular groove 7, the molten aluminum 1' in the annular groove 7 expands due to the large amount of heat, so that the molten aluminum 1' might spout outside from the annular groove 7.

In view of this, in the different material joining method of the present embodiment, in the forming step as well as the penetration step, pressurization and current application is performed while the molten aluminum 1' is blown off with the air.

More specifically, in the forming step, as illustrated in FIG. 1C, the rivet 3, the aluminum plate 1, and the iron plate 2 are subjected to pressurization and current application by the first and second electrodes 8, 9 so as to melt the shank 5 and the iron plate 2 by generated Joule heat, so that the nugget 10 is formed between the shank 5 and the iron plate 2. At this time, as indicated by a black arrow in FIG. 1C, pressurization and current application is performed while the air is blown to a side face 4a of the head 4 so that the air hits a region around a boundary 1b between the head 4 and the aluminum plate 1.

As such, the molten aluminum 1' in the annular groove 7 is cooled by blowing the air to the side face 4a of the head 4, and therefore, even in a case where a large amount of heat is applied to enlarge the nugget 10, the expansion of the molten aluminum 1' in the annular groove 7 can be restrained. Accordingly, it is possible to restrain the molten aluminum 1' from spouting outside from the annular groove 7, thereby making it possible to restrain the molten aluminum 1' from spouting out from the boundary 1b between the head 4 and the aluminum plate 1.

Even if the molten aluminum 1' spouts out, the air is blown to the side face 4a of the head 4 so that the air hits the region around the boundary 1b between the head 4 and the aluminum plate 1. Accordingly, it is possible to blow off the molten aluminum 1' spouting out from the boundary 1b, thereby making it possible to surely restrain the occurrence of the burr B in the joining portion.

As described above, with the different material joining method of the present embodiment, it is possible to remove the molten aluminum 1' from the vicinity of the joining portion, thereby making it possible to restrain the occurrence of the burr B in the joining portion without upsizing the rivet 3. Besides, by removing the molten aluminum 1', the head 4 of the rivet 3 can make close contact with the aluminum plate 1, thereby making it possible to improve the joining strength.

Note that the rivet used in the different material joining method of the present embodiment is not limited to the rivet 3, and rivets 3A, 3B, 3C, 3D, 3E, 3F, 3G, 3H having various shapes as illustrated in FIGS. 3A to 3H can be used.

Figure 3A:
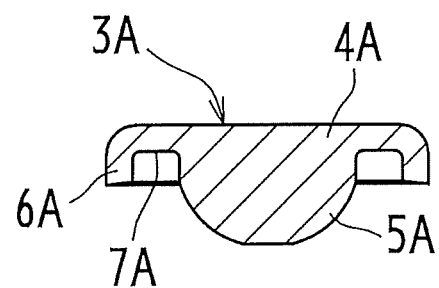
FIG. 3A is a view schematically illustrating an example of a rivet.

For example, as illustrated in FIG. 3A, the rivet 3A with an annular groove 7A may be used, and the rivet 3A includes a disk-shaped head 4A in which an annular wall 6A is formed by bending an outer peripheral edge, and a shank 5A gradually reduced in diameter toward its distal end.

Figure 3B:
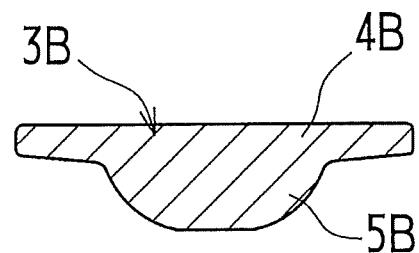
FIG. 3B is a view schematically illustrating an example of the rivet.

Further, as illustrated in FIG. 3B, the rivet 3B without an annular groove may be used, and the rivet 3B includes a disk-shaped head 4B in which R-processing is performed on outer peripheral edges of a top face and a bottom face and the bottom face has a tapered surface, and a shank 5B gradually reduced in diameter toward its distal end.

Figure 3C:
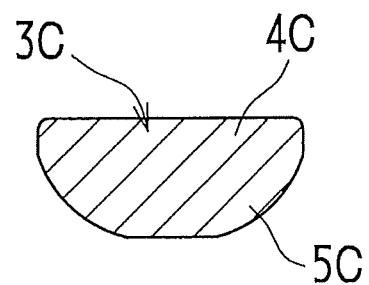
FIG. 3C is a view schematically illustrating an example of the rivet.

Further, as illustrated in FIG. 3C, the rivet 3C without an annular groove may be used, and the rivet 3C includes a shank 5C gradually reduced in diameter toward its distal end, and a disk-shaped head 4C having an outside diameter that is generally the same as the outside diameter of an upper end of the shank 5C.

Figure 3D:
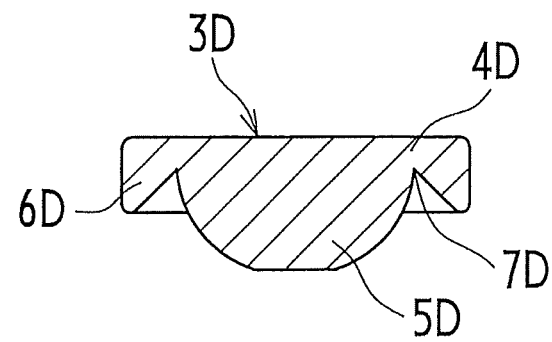
FIG. 3D is a view schematically illustrating an example of the rivet.

Further, as illustrated in FIG. 3D, the rivet 3D with an annular groove 7D may be used, and the rivet 3D includes a disk-shaped head 4D in which an annular wall 6D having a wedge-shaped section is formed, and a shank 5D gradually reduced in diameter toward its distal end.

Figure 3E:
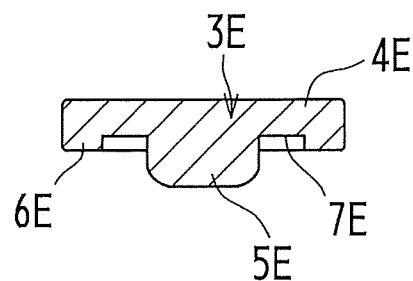
FIG. 3E is a view schematically illustrating an example of the rivet.

Further, as illustrated in FIG. 3E, the rivet 3E with an annular groove 7E having a small volume may be used, and the rivet 3E includes a relatively thick disk-shaped head 4E in which an annular wall 6E having a low projection height is formed, and a columnar shank 5E.

Figure 3F:
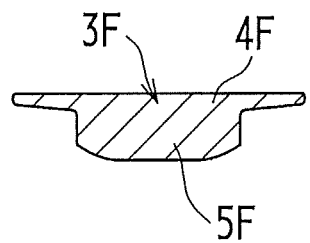
FIG. 3F is a view schematically illustrating an example of the rivet.

Further, as illustrated in FIG. 3F, the rivet 3F without an annular groove may be used, and the rivet 3F includes a relatively thin disk-shaped head 4F in which a bottom face is a tapered surface, and a columnar shank 5F.

Figure 3G:
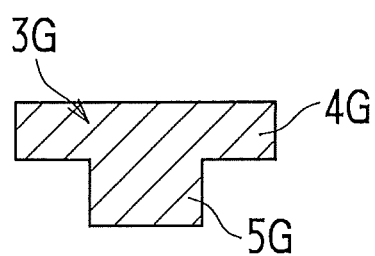
FIG. 3G is a view schematically illustrating an example of the rivet.

Further, as illustrated in FIG. 3G, the rivet 3G having a T-shaped section without an annular groove may be used, and the rivet 3G includes a disk-shaped head 4G and a columnar shank 5G.

Figure 3H:
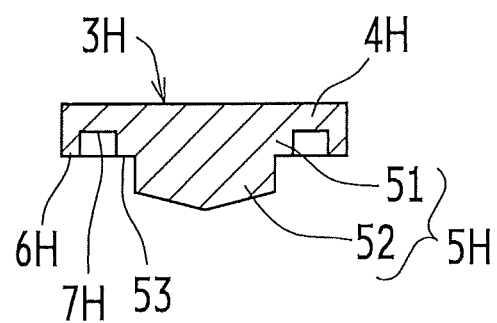
FIG. 3H is a view schematically illustrating an example of the rivet.

Further, as illustrated in FIG. 3H, the rivet 3H with an annular groove 7H may be used, and the rivet 3H includes a disk-shaped head 4H in which an annular wall 6H is formed, and a columnar shank 5H in which a large-diameter portion 51 and a small-diameter portion 52 are connected via a stepped surface 53.

Modification

The present modification is different from the first embodiment in that the rivet 3G does not have an annular groove and air blow is not performed in the forming step. The following mainly describes points different from the first embodiment.

Figure 4A:
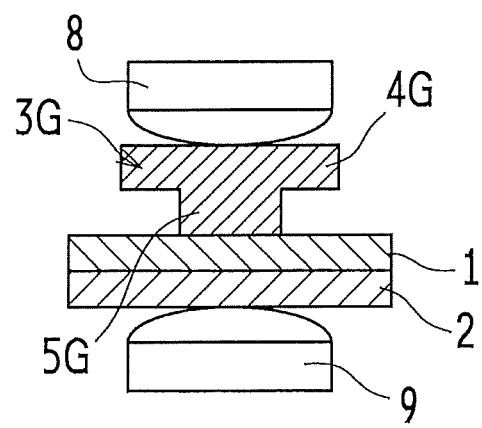
FIG. 4A is a view to schematically describe the sandwiching step in the different material joining method.

In the present modification, the rivet 3G having a T-shaped section illustrated in FIG. 3G is used as a rivet. In this case, the aluminum plate 1 is joined to the iron plate 2 in the procedure illustrated in FIGS. 4A to 4C. More specifically, in the sandwiching step, as illustrated in FIG. 4A, the rivet 3G, the aluminum plate 1, and the iron plate 2 are sandwiched between the first electrode 8 and the second electrode 9 so that the head 4G, the shank 5G, the aluminum plate 1, and the iron plate 2 are arranged in this order.

Figure 4B:
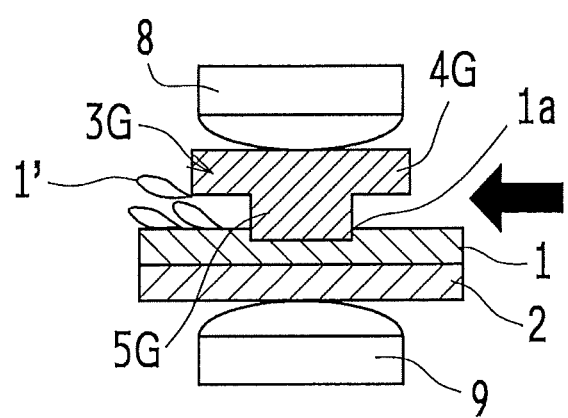
FIG. 4B is a view to schematically describe the penetration step in the different material joining method.

Subsequently, in the penetration step, as illustrated in FIG. 4B, the rivet 3G, the aluminum plate 1, and the iron plate 2 are subjected to pressurization and current application by the first and second electrodes 8, 9 so that the shank 5G penetrates through the aluminum plate 1. At this time, as indicated by a black arrow in FIG. 4B, pressurization and current application is performed while the air is blown to a side face of the shank 5G so that the air hits the region around the boundary 1a between the shank 5G and the aluminum plate 1. As such, the pressurization and current application is performed while the air is blown to the side face of the shank 5G so that the air hits the region around the boundary 1a, thereby making it possible to sequentially blow off the molten aluminum 1' spouting out from the boundary 1a.

Figure 4C:
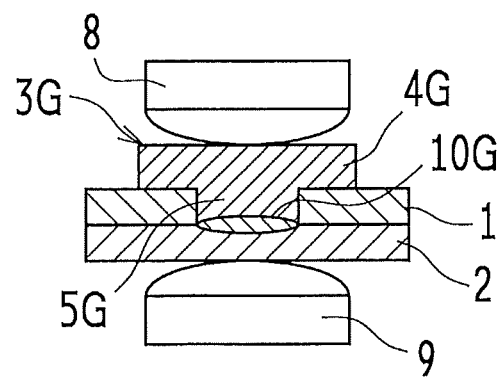
FIG. 4C is a view to schematically describe the forming step in the different material joining method.

Subsequently, in the forming step, as illustrated in FIG. 4C, the rivet 3G, the aluminum plate 1, and the iron plate 2 are subjected to pressurization and current application by the first and second electrodes 8, 9 so that a nugget 10G is formed between the shank 5G and the iron plate 2.

As described above, a generation amount of the molten aluminum 1' in the forming step is small in comparison with that in the penetration step in which the aluminum plate 1 is replaced with the shank 5G. Accordingly, it is not necessary to enlarge the nugget 10G, for example, and if a large amount of heat is not applied, the air blow in the forming step may be omitted as illustrated in FIG. 4C. That is, in the first embodiment and the present modification, the air blow in the penetration step is necessary, but the air blow in the forming step should be performed appropriately depending on a required joining strength or the like.

Second Embodiment

The present embodiment is different from the first embodiment in the shape of a rivet 13 and in that the air flow rate is controlled. The following mainly describes points different from the first embodiment.

Figure 5A:
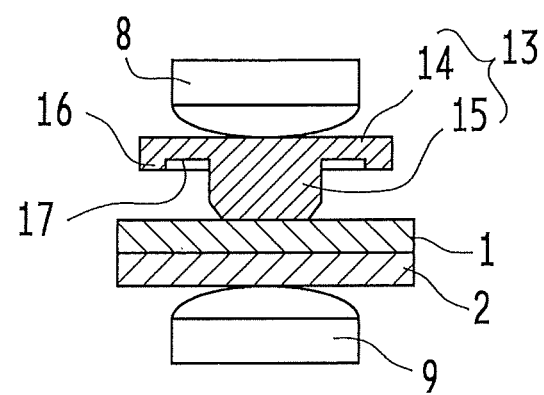
FIG. 5A is a view to schematically describe a sandwiching step in a different material joining method according to a second embodiment of the disclosure.
Figure 5B:
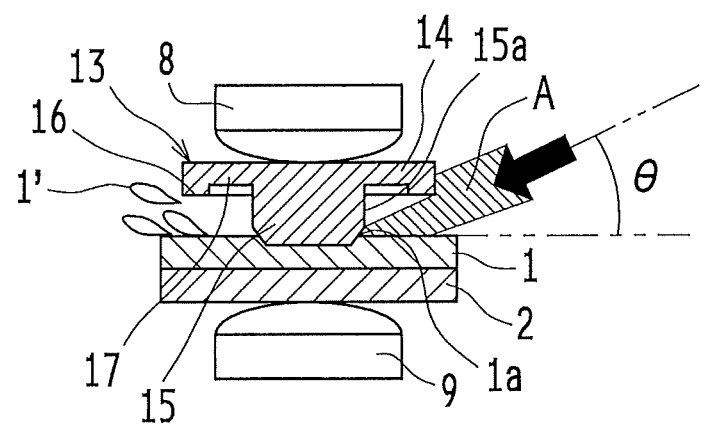
FIG. 5B is a view to schematically describe a penetration step in the different material joining method.
Figure 5C:
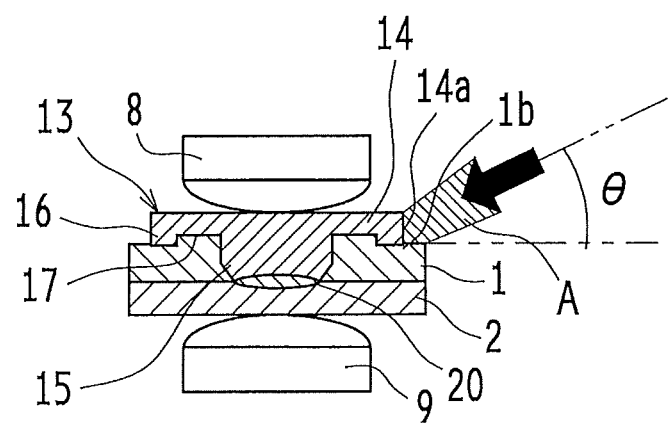
FIG. 5C is a view to schematically describe a forming step in the different material joining method.

FIG. 5A is a view to schematically describe a sandwiching step in a different material joining method according to the present embodiment, FIG. 5B is a view to schematically describe a penetration step, and FIG. 5C is a view to schematically describe a forming step. As illustrated in FIGS. 5A to 5C, in this different material joining method, a plurality of metal members including a dissimilar metal member is joined by resistance welding by use of the rivet 13, similarly to the first embodiment. Further, in the penetration step, pressurization and current application is performed while the air A is blown to a side face 15a of a shank 15 so that the air A hits the region around the boundary 1a between the shank 15 and the aluminum plate 1, and this is also similar to the first embodiment.

In this different material joining method, the rivet 13, the aluminum plate (the first metal member) 1, the iron plate (the nth metal member) 2, and the first and second electrodes 8, 9 are prepared.

As the rivet 13, an iron rivet including a head 14 and the shank 15 is prepared as illustrated in FIG. 5A. The shank 15 is formed in a columnar shape and projects in one direction from the central part of the head 14 formed into a disk shape. Further, an annular wall 16 projecting in the same direction as the shank 15 is provided over a whole circumference of an outer peripheral edge of the head 14, and hereby, an annular groove 17 sectioned by an outer peripheral surface of the shank 15, one surface of the head 14, and an inner peripheral surface of the annular wall 16 is formed around the shank 15.

That such an annular groove 17 is formed in the head 14 is effective to raise the joining strength. A reason thereof is as follows: when the molten aluminum 1' accommodated in the annular groove 17 solidifies, the sectional area in the shearing direction increases, so that the shear strength of the joining portion increases.

Even in a case where such an annular groove 17 is provided, if the molten aluminum 1' is not filled into the annular groove 17, in other words, if a void is formed in the annular groove 17, the improvement of the joining strength cannot be expected. For example, in the rivet 103 of the first related art as illustrated in FIG. 16A, the volume Vg' of the annular groove 107 is set to be the volume Vp' of the pilot portion 105' or more, and therefore, even if the molten aluminum 101' moves to the annular groove 107, the annular groove 107 is not filled with the molten aluminum 101', so that it is assumed that a void is formed in the annular groove 107.

Figure 17A:
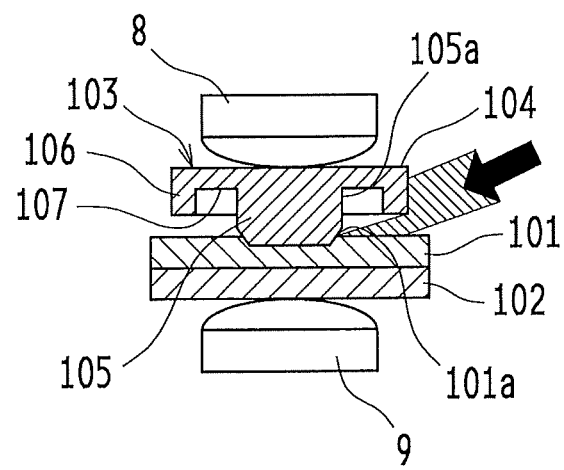
FIG. 17A is a view schematically illustrating a case where the projection height of an annular wall is high.
Figure 17B:
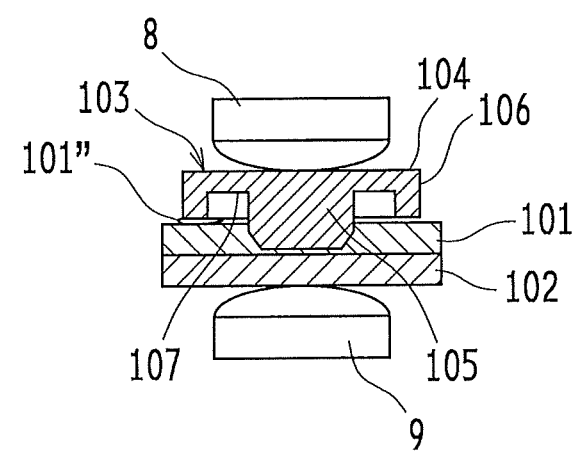
FIG. 17B is a view schematically illustrating a case where the projection height of the annular wall is high.

Further, in the rivet 103 of the first related art in which the volume Vg' of the annular groove 107 is set to the volume Vp' of the pilot portion 105' or more, the projection height of the annular wall 106 is often relatively high. As a result, as illustrated in FIG. 17A, in the penetration step, even if the air A is blown to a side face 105a of the shank 105 so that the air A hits a region around a boundary 101a between the shank 105 and the aluminum plate 101, it is assumed that the air A hits the annular wall 106 and the loss of the air A accordingly becomes large. Further, in a case where the projection height of the annular wall 106 is relatively high, a distance between a distal end of the annular wall 106 and the aluminum plate 101 is narrow, and therefore, in an early stage of the penetration step in which a generation amount of the molten aluminum 101' is relatively large, it is also assumed that aluminum 101" blown off by the air A is sandwiched between the distal end of the annular wall 106 and the aluminum plate 101, as illustrated in FIG. 17B.

In view of this, in the different material joining method of the present embodiment, a rivet in which the volume Vg of the annular groove 17 is smaller than the volume Vp of a pilot portion 15', of the shank 15, that projects from the annular wall 16 is used as the rivet 13, and the air flow rate is controlled so that the molten aluminum 1' is filled into the annular groove 17 in the penetration step.

Figure 6A:
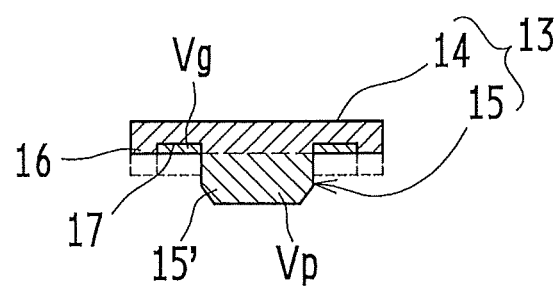
FIG. 6A is a view schematically illustrating an example of a rivet.
Figure 6B:
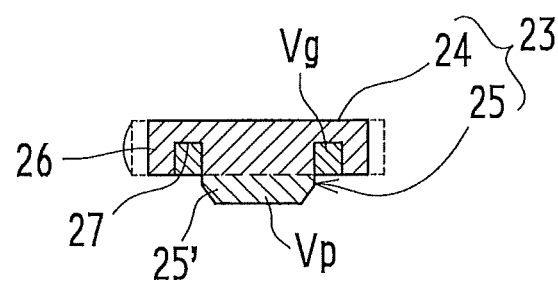
FIG. 6B is a view schematically illustrating an example of the rivet.

FIGS. 6A and 6B are views schematically illustrating examples of the rivets 13, 23. Note that a broken line in FIGS. 6A and 6B indicates the annular wall 106 and the annular groove 107 of the rivet 103 in the first related art illustrated in FIG. 16A. As a configuration in which the volume Vg of the annular groove 17 is made smaller than the volume Vp of the pilot portion 15', it is conceivable that the projection height of the annular wall 16 is relatively lowered in the rivet 13, as illustrated in FIG. 6A. Further, as another configuration in which the volume Vg of an annular groove 27 is made smaller than the volume Vp of a pilot portion 25' of a shank 25, it is also conceivable that the diameter of a head 24 is reduced (the groove width of the annular groove 27 is narrowed) in the rivet 23 while the projection height of an annular wall 26 is maintained to be relatively high, as illustrated in FIG. 6B. Note that, in the present embodiment, the rivet 13 in which the projection height of the annular wall 16 is set to be relatively low as illustrated in FIG. 6A is employed.

The different material joining method, of the present embodiment, that uses such a rivet 13 includes the sandwiching step illustrated in FIG. 5A, the penetration step illustrated in FIG. 5B, and the forming step illustrated in FIG. 5C, similarly to the first embodiment.

First, in the sandwiching step, as illustrated in FIG. 5A, the rivet 13, the aluminum plate 1, and the iron plate 2 are sandwiched between the first electrode 8 and the second electrode 9 of the resistance spot welder so that the head 14, the shank 15, the aluminum plate 1, and the iron plate 2 are arranged in this order.

In the subsequent penetration step, as illustrated in FIG. 5B, the rivet 13, the aluminum plate 1, and the iron plate 2 are subjected to pressurization and current application in such a manner that the first electrode 8 and the second electrode 9 are made come close to each other so that a welding pressure is applied to the head 14 of the rivet 13 and the iron plate 2, and a pulse current is applied between the first and second electrodes 8, 9, and hereby, the aluminum plate 1 is melted by generated Joule heat so that the shank 15 penetrates through the aluminum plate 1. At this time, as indicated by a black arrow in FIG. 5B, the pressurization and current application is performed while the air A is blown to the side face 15a of the shank 15 from a direction inclined by an angle θ from the surface, of the aluminum plate 1, that is perpendicular to the shank 15 so that the air A hits the region around the boundary 1a between the shank 15 and the aluminum plate 1.

Here, in the different material joining method of the present embodiment, the rivet 13 in which the projection height of the annular wall 16 is set to be relatively low is employed, and therefore, as illustrated in FIG. 5B, in the air A blown to the side face 15a of the shank 15, the air A hitting the annular wall 16 is reduced, so that it is possible to restrain the loss of the air A.

Further, the projection height of the annular wall 16 is set to be relatively low, and therefore, the distance between the distal end of the annular wall 16 and the aluminum plate 1 is relatively large, so that, even in an early stage of the penetration step in which a generation amount of the molten aluminum 1' is relatively large as illustrated in FIG. 5B, aluminum blown off by the air A is not sandwiched between the distal end of the annular wall 16 and the aluminum plate 1.

In the different material joining method of the present embodiment, by controlling the air flow rate, it is possible to adjust the amount of the molten aluminum 1' to be blown off in the penetration step. More specifically, when the air flow rate is set to be relatively large, for example, the molten aluminum 1' spouting out can be blown off. In the meantime, when the air flow rate is set to be relatively low, for example, the amount of the molten aluminum 1' to be blown off is adjusted, so that the amount of the molten aluminum 1' to be accommodated in the annular groove 17 can be adjusted.

Besides, the volume Vp of the pilot portion 15' is generally equal to a part, of the shank 15, that penetrates through the aluminum plate 1. In the present embodiment, the volume Vg of the annular groove 17 is smaller than the volume Vp of the pilot portion 15', in other words, the volume Vg of the annular groove 17 is smaller than the volume of the molten aluminum 1' replaced with the shank 15 and spouting out. In view of this, by controlling the air flow rate appropriately, the annular groove 17 can be easily filled with the molten aluminum 1' spouting out. Then, when the molten aluminum 1' filled in the annular groove 17 solidifies, the shear strength increases, thereby making it possible to improve the joining strength.

In the subsequent forming step, as illustrated in FIG. 5C, the rivet 13, the aluminum plate 1, and the iron plate 2 are subjected to pressurization and current application by the first and second electrodes 8, 9 so as to melt the shank 15 and the iron plate 2 by generated Joule heat, so that a nugget 20 is formed between the shank 15 and the iron plate 2. At this time, as indicated by a black arrow in FIG. 5C, the pressurization and current application is performed while the air A is blown to a side face 14a of the head 14 from a direction inclined by an angle θ from the surface, of the aluminum plate 1, that is perpendicular to the shank 15 so that the air A hits the region around the boundary 1b between the head 14 and the aluminum plate 1.

At this time, when a large amount of heat is applied to enlarge the nugget 20 in order to increase the joining strength, the aluminum plate 1 around the shank 15 also melts and spouts out, so that the annular groove 17 is more surely filled with the molten aluminum 1'.

Further, the molten aluminum 1' filled in the annular groove 17 is cooled by blowing the air A to the side face 14a of the head 14, so that the molten aluminum 1' in the annular groove 17 can be restrained from expanding. Accordingly, it is possible to restrain the molten aluminum 1' filled in the annular groove 17 from spouting outside from the annular groove 17, thereby making it possible to restrain the molten aluminum 1' from spouting out from the boundary 1b between the head 14 and the aluminum plate 1.

Since the air A is blown to the side face 14a of the head 14 so that the air A hits the region around the boundary 1b between the head 14 and the aluminum plate 1, even if the molten aluminum 1' spouts out, it is possible to blow off the molten aluminum 1' spouting out from the boundary 1b, thereby making it possible to surely restrain the occurrence of the burr B in the joining portion.

As described above, with the different material joining method of the present embodiment, while the joining strength is improved, it is possible to restrain the occurrence of the burr B in the joining portion. Besides, the volume of the annular groove 17 is set to be relatively small, so that it is possible to restrain upsizing of the rivet 13.

Note that the rivet to be used in the different material joining method of the present embodiment is not limited to the rivet 13, and rivets 13A, 13B, 13C, 13D having various shapes as illustrated in FIGS. 7A to 7D can be used.

Figure 7A:
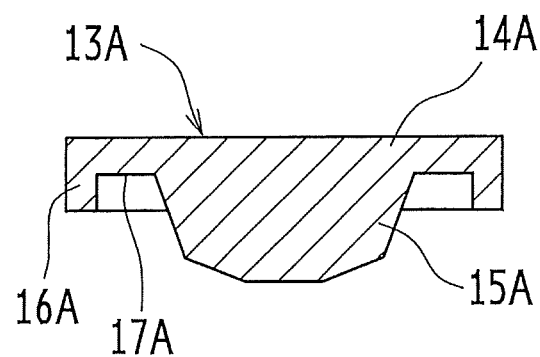
FIG. 7A is a view schematically illustrating an example of the rivet.

For example, as illustrated in FIG. 7A, the rivet 13A including a disk-shaped head 14A in which an annular wall 16A having a projection height similar to that in the related art is formed, and a shank 15A gradually increased in diameter toward its base end (the head 14A side) may be used, and the rivet 13A has an annular groove 17A having a relatively small volume due to the increase of the diameter of the shank 15A.

Figure 7B:
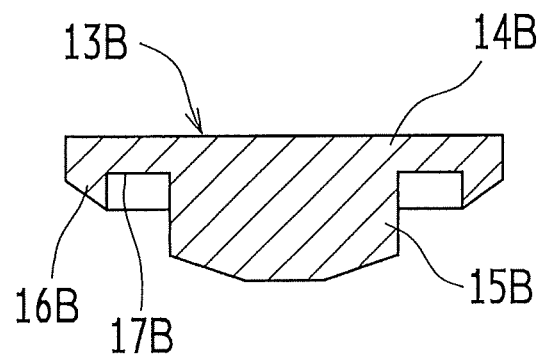
FIG. 7B is a view schematically illustrating an example of the rivet.

Further, as illustrated in FIG. 7B, the rivet 13B with an annular groove l7B having a relatively small volume may be used. The rivet 13B includes a disk-shaped head 14B and a columnar shank 15B. The disk-shaped head 14B has an annular wall 16B. The annular wall 16B has a relatively low projection height and has a triangular section tapered toward its distal end so that the air A blown from an inclined direction does not hit the annular wall 16B.

Figure 7C:
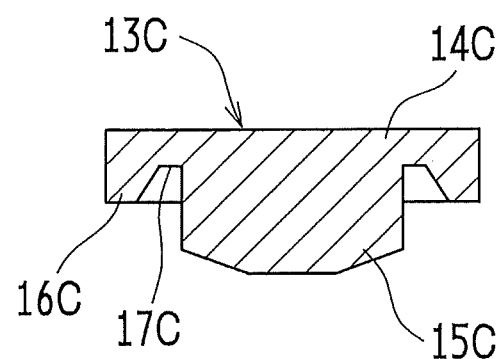
FIG. 7C is a view schematically illustrating an example of the rivet.

Further, as illustrated in FIG. 7C, the rivet 13C including a disk-shaped head 14C in which an annular wall 16C having a projection height similar to that in the related art and having an inside diameter gradually decreased toward its base end is formed, and a columnar shank 15C may be used, and the rivet 13C has an annular groove 17C having a relatively small volume due to the decrease of the inside diameter of the annular wall 16C.

Figure 7D:
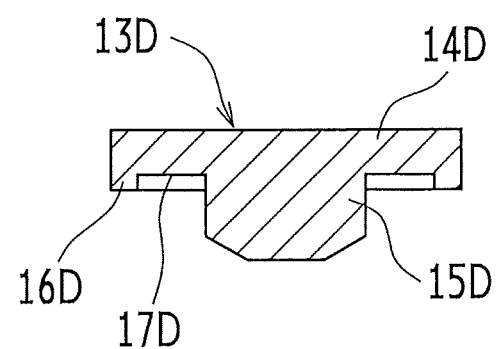
FIG. 7D is a view schematically illustrating an example of the rivet.

Further, as illustrated in FIG. 7D, the rivet 13D including a relatively thick disk-shaped head 14D in which an annular wall 16D is formed, and a columnar shank 15D may be used, and the rivet 13D has an annular groove 17D having a relatively small volume due to the head 14D being thickened.

Third Embodiment

The present embodiment is different from the modification of the first embodiment in that a relationship between a current value in pressurization and current application in the penetration step and a current value in pressurization and current application in the forming step is defined. The following mainly describes points different from the modification of the first embodiment.

Figure 8A:
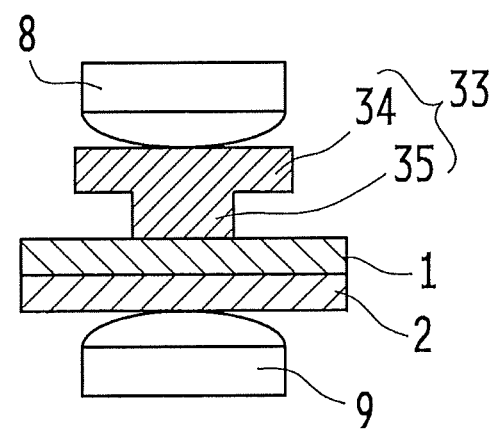
FIG. 8A is a view to schematically describe a sandwiching step in a different material joining method according to a third embodiment of the disclosure.
Figure 8B:
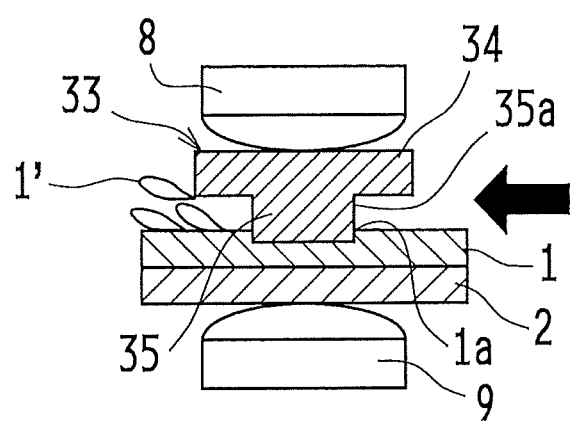
FIG. 8B is a view to schematically describe a penetration step in the different material joining method.
Figure 8C:
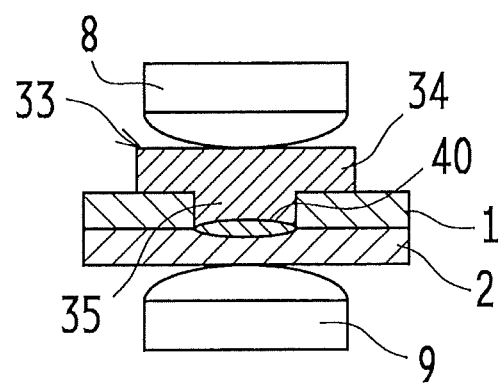
FIG. 8C is a view to schematically describe a forming step in the different material joining method.
Figure 8D:
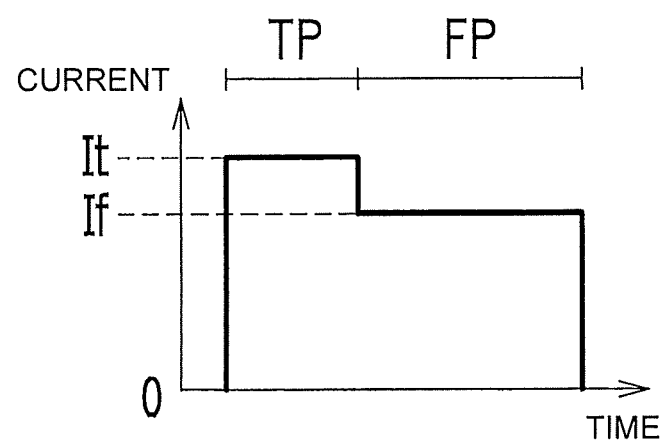
FIG. 8D is a view to schematically describe a current application pattern in the different material joining method.

FIG. 8A is a view to schematically describe a sandwiching step in a different material joining method according to the present embodiment, FIG. 8B is a view to schematically describe a penetration step, FIG. 8C is a view to schematically describe a forming step, and FIG. 8D is a view to schematically describe a current application pattern in the different material joining method. Note that TP in FIG. 8D corresponds to the penetration step, and FP corresponds to the forming step.

As illustrated in FIGS. 8A to 8C, in this different material joining method, a plurality of metal members including a dissimilar metal member is joined by resistance welding by use of a rivet 33, similarly to the modification of the first embodiment. Further, in the penetration step, pressurization and current application is performed while the air is blown to a side face 35a of a shank 35 so that the air hits the region around the boundary 1a between the shank 35 and the aluminum plate 1, and this is also similar to the modification of the first embodiment. Note that the rivet 33 is similar to the rivet 3G in FIG. 3G.

In the different material joining method, the rivet 33, the aluminum plate (the first metal member) 1, the iron plate (the nth metal member) 2, and the first and second electrodes 8, 9 are prepared. The rivet 33 having a T-shaped section and including a disk-shaped head 34 and the columnar shank 35 is prepared as the rivet 33 as illustrated in FIG. 8A.

First, in the sandwiching step, as illustrated in FIG. 8A, the rivet 33, the aluminum plate 1, and the iron plate 2 are sandwiched between the first electrode 8 and the second electrode 9 of the resistance spot welder so that the head 34, the shank 35, the aluminum plate 1, and the iron plate 2 are arranged in this order.

In the subsequent penetration step, as illustrated in FIG. 8B, the rivet 33, the aluminum plate 1, and the iron plate 2 are subjected to pressurization and current application in such a manner that the first electrode 8 and the second electrode 9 are made come close to each other so that a welding pressure is applied to the head 34 of the rivet 33 and the iron plate 2, and a pulse current is applied between the first and second electrodes 8, 9, and hereby, the aluminum plate 1 is melted by generated Joule heat so that the shank 35 penetrates through the aluminum plate 1. At this time, as indicated by a black arrow in FIG. 8B, the pressurization and current application is performed while the air is blown to the side face 35a of the shank 35 so that the air hits the region around the boundary 1a between the shank 35 and the aluminum plate 1.

In the subsequent forming step, as illustrated in FIG. 8C, the rivet 33, the aluminum plate 1, and the iron plate 2 are subjected to pressurization and current application by the first and second electrodes 8, 9 so as to melt the shank 35 and the iron plate 2 by generated Joule heat, so that a nugget 40 is formed between the shank 35 and the iron plate 2.

Next will be described the current application pattern illustrated in FIG. 8D. However, prior to this, a current application pattern in a different material joining method of a second related art will be described for easy understanding of the present embodiment.

Figure 18A:
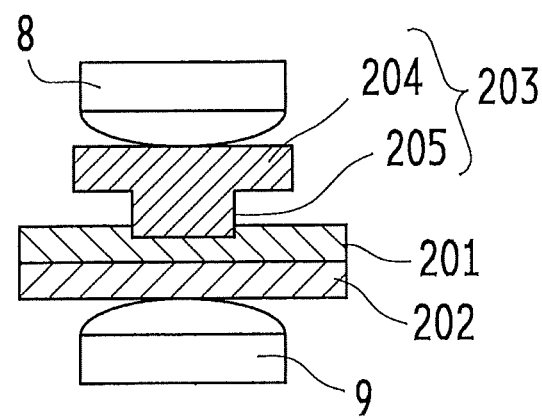
FIG. 18A is a view to schematically describe a penetration step in a different material joining method of a second related art.
Figure 18B:
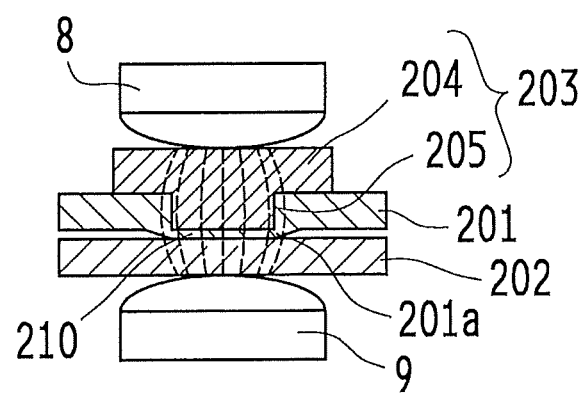
FIG. 18B is a view to schematically describe a forming step in the different material joining method of the second related art.
Figure 18C:
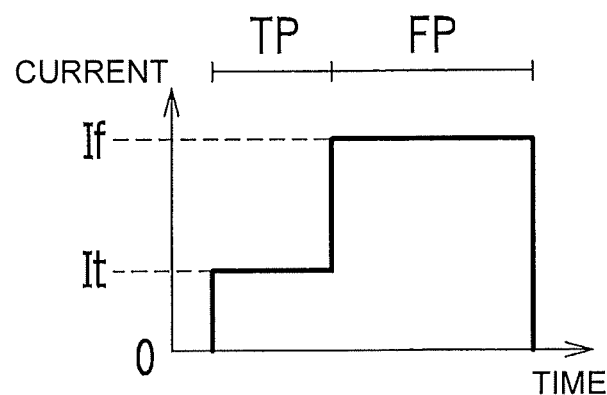
FIG. 18C is a view to schematically describe a current application pattern in the different material joining method of the second related art.

FIG. 18A is a view to schematically describe a penetration step in the different material joining method of the second related art, FIG. 18B is a view to schematically describe a forming step in the different material joining method of the second related art, and FIG. 18C is a view to schematically describe the current application pattern in the different material joining method of the second related art. Note that TP in FIG. 18C corresponds to the penetration step, and FP corresponds to the forming step.

As illustrated in FIG. 18A and FIG. 18B, in the different material joining method of the second related art, after a rivet 203, an aluminum plate 201, and an iron plate 202 are sandwiched between the first electrode 8 and the second electrode 9 so that a head 204, a shank 205, the aluminum plate 201, and the iron plate 202 are arranged in this order, they are subjected to pressurization and current application so as to form a nugget 210 between the iron plate 202 and the shank 205 penetrating through the aluminum plate 201, and this is similar to the present embodiment.

When the shank 205 is caused to penetrate through the aluminum plate 201 at a high current in the penetration step, the aluminum plate 201 melts to cause the burr B. Accordingly, in the penetration step in the different material joining method of the second related art, as illustrated in FIG. 18C, the aluminum plate 201 is softened at a low current (a current value It) that is less than 80% of a current value If of pressurization and current application in the forming step, for example, so that the shank 205 penetrates through the aluminum plate 201. In this technique, the aluminum plate 201 simply softens without melting, so that no burr B is formed. As a result, blowing of the air like the present embodiment is needless.

However, in the different material joining method of the second related art, when the shank 205 is pushed in, the aluminum plate 201 thus softening is pushed out to the backside (the iron plate 202 side) by the rivet 203 instead of molten aluminum being replaced with the shank 205 and spouting out. Accordingly, an expansion portion 201a in a range wider than the area of a distal end of the shank 205 is formed on the back of the aluminum plate 201 as illustrated in FIG. 18B. Such an expansion portion 201a serves as an electric current path. Accordingly, in the different material joining method of the second related art, the electric current path is widened and a current value necessary to form the nugget 210 increases in comparison with a case where the shank 205 of the rivet 203 serves as an electric current path, thereby resulting in that poor welding might be caused (the nugget 210 might be formed poorly).

In view of this, in the different material joining method of the present embodiment, as illustrated in FIG. 8D, the pressurization and current application in the penetration step is performed at a current value It that is not less than a current value If in the pressurization and current application in the forming step, more exactly, at the current value It higher than the current value If in the pressurization and current application in the forming step. Since the pressurization and current application in the penetration step is performed at the current value It higher than the current value If in the forming step as such, the aluminum plate 1 is melted actively. Accordingly, the aluminum plate 1 is not pushed out to the backside by the rivet 33, thereby making it possible to restrain expansion of the electric current path. Further, since the pressurization and current application is performed at the relatively high current value It, it is possible to melt the aluminum plate 1 actively, thereby making it possible to shorten the penetration step.

When the aluminum plate 1 is melted actively at a high current in the penetration step as such, the molten aluminum 1' spouts out from the boundary 1a between the shank 35 and the aluminum plate 1. However, the air is blown to the side face 35a of the shank 35 so that the air hits the region around the boundary 1a as described above, so that the molten aluminum 1' thus spouting out can be blown off with the air.

As described above, in the different material joining method of the present embodiment, with a simple configuration in which the pressurization and current application in the penetration step is performed at the current value It that is higher than the current value If of the pressurization and current application in the forming step while the air is blown to the side face 35a of the shank 35, it is possible to restrain the occurrence of the burr B in the joining portion, to shorten the penetration step, and to restrain poor generation of the nugget 40.

Figure 9:
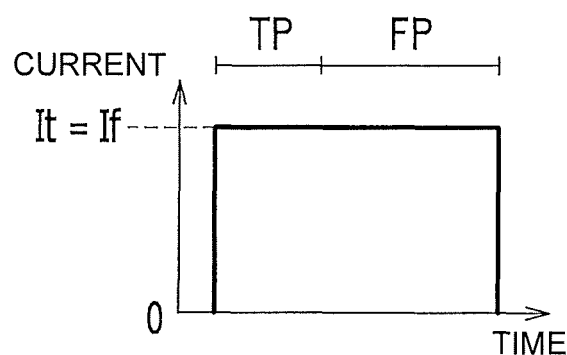
FIG. 9 is a view schematically illustrating an example of the current application pattern.

Note that the current value It of the pressurization and current application in the penetration step should be not less than the current value If of the pressurization and current application in the forming step, and the current value It of the pressurization and current application in the penetration step and the current value If of the pressurization and current application in the forming step may be set to the same value as illustrated in FIG. 9, for example. With such a configuration, it is possible to achieve simplification of the control on the resistance spot welder.

Further, the rivet used in the different material joining method of the present embodiment is not limited to the rivet 33, and the rivets 3A, 3B, 3C, 3D, 3E, 3F, 3H illustrated in FIGS. 3A to 3F and FIG. 3H and the rivets 13A, 13B, 13C, 13D illustrated in FIGS. 7A to 7D can be used.

Further, in the present embodiment, the air blow in the forming step may be also performed appropriately depending on a required joining strength and the like.

Modification

The present modification is different from the third embodiment in that an initial current value of the pressurization and current application in the penetration step is lower than an initial current value of the pressurization and current application in the forming step. The following mainly describes points different from the third embodiment.

In the third embodiment, the current value It of the pressurization and current application in the penetration step is not less than the current value If of the pressurization and current application in the forming step, but the current value It may not necessarily be the current value If or more, provided that the aluminum plate 1 can be surely melted in the penetration step. For example, when the current value It of the pressurization and current application in the penetration step is at least 0.8 times the current value If of the pressurization and current application in the forming step, the aluminum plate 1 can be melted sufficiently.

In view of this, in the different material joining method of the present modification, when an initial current value Ist at the time when the pressurization and current application is started in the penetration step is set to be not less than 0.8 times an initial current value Isf at the time when the pressurization and current application is started in the forming step, the aluminum plate 1 is surely melted in the penetration step. FIGS. 10A to 10H are views schematically illustrating examples of the current application pattern in the present modification.

Figure 10A:
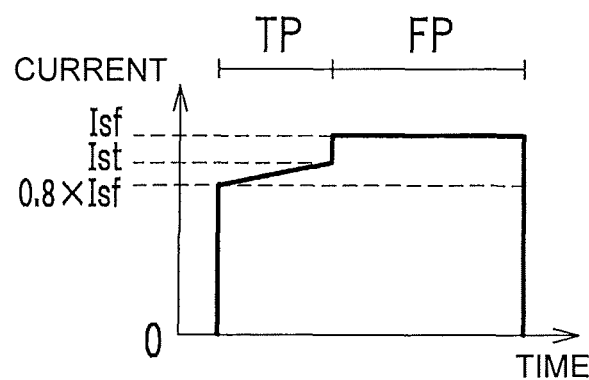
FIG. 10A is a view schematically illustrating an example of a current application pattern according to a modification of the third embodiment.

For example, in the current application pattern illustrated in FIG. 10A, in the penetration step, upslope current application in which the current value is gradually increased from the initial current value Ist (=0.8×initial current value Isf) is performed, but in the forming step, current application is performed at the initial current value Isf without changing the current value. In the penetration step, when a contact area between the shank of the rivet and the aluminum plate 1 increases, it is necessary to apply a larger amount of current. Accordingly, the upslope current application in the penetration step is suitable for a case of using a rivet including a shank configured such that its distal end is relatively small and its diameter increases toward its base end, for example.

Figure 10B:
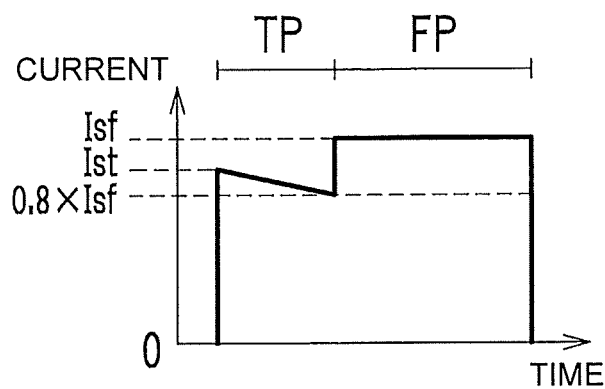
FIG. 10B is a view schematically illustrating an example of the current application pattern.

Further, in the current application pattern illustrated in FIG. 10B, in the penetration step, downslope current application in which the current value is gradually decreased from the initial current value Ist (>0.8×initial current value Isf) is performed, but in the forming step, current application is performed at the initial current value Isf without changing the current value. At the time of machining start, the temperatures of the rivet and the aluminum plate 1 are low, and therefore, it is preferable to perform machining at a high current value in an early stage. In view of this, the downslope current application in the penetration step is suitable for a case of using a rivet including a shank with a flat distal end, for example.

Figure 10C:
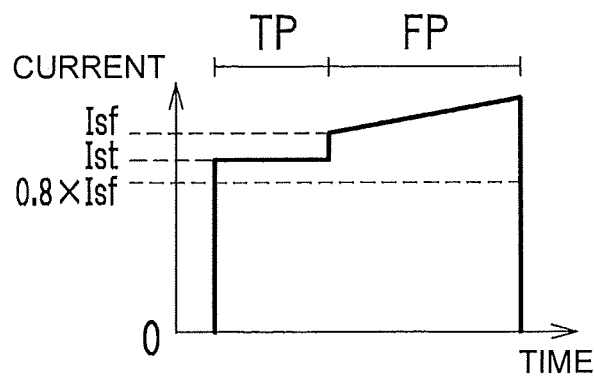
FIG. 10C is a view schematically illustrating an example of the current application pattern.

Further, in the current application pattern illustrated in FIG. 10C, in the penetration step, current application is performed at the initial current value Ist (>0.8×initial current value Isf) without changing the current value, but in the forming step, upslope current application in which the current value is gradually increased from the initial current value Isf is performed. When, in the forming step, the initial current value Isf is set to be relatively high and current application is performed with such a high current value being maintained, a large amount of the molten aluminum 1' might spout out due to a sudden temperature rise. In view of this, the upslope current application in the penetration step is suitable for a case where the occurrence of the burr B is to be restrained without performing the air blow, for example.

Figure 10D:
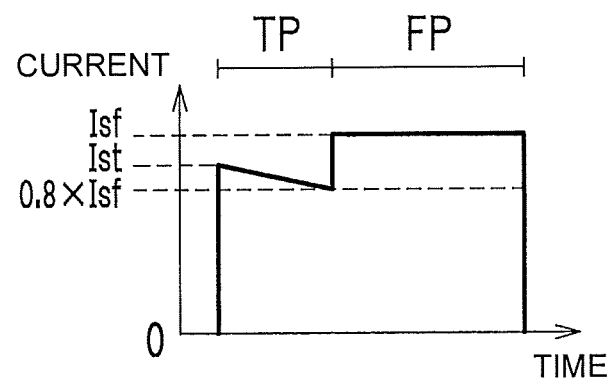
FIG. 10D is a view schematically illustrating an example of the current application pattern.

Further, in the current application pattern illustrated in FIG. 10D, in the penetration step, downslope current application in which the current value is gradually decreased from the initial current value Ist (>0.8×initial current value Isf) is preformed, but in the forming step, current application is performed at the initial current value Isf without changing the current value.

Figure 10E:
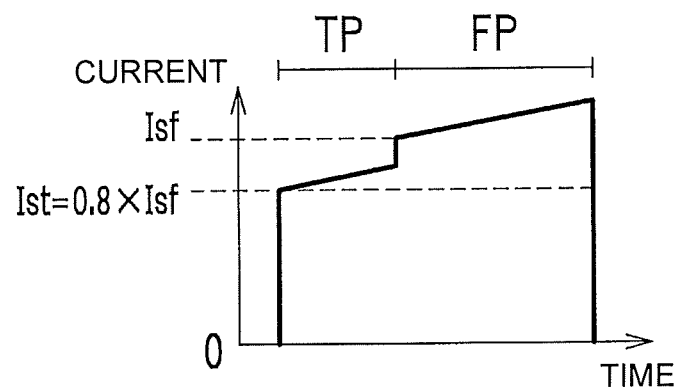
FIG. 10E is a view schematically illustrating an example of the current application pattern.

Further, in the current application pattern illustrated in FIG. 10E, in the penetration step, upslope current application in which the current value is gradually increased from the initial current value Ist (=0.8×initial current value Isf) is performed. Also in the forming step, upslope current application in which the current value is gradually increased from the initial current value Isf is performed.

Figure 10F:
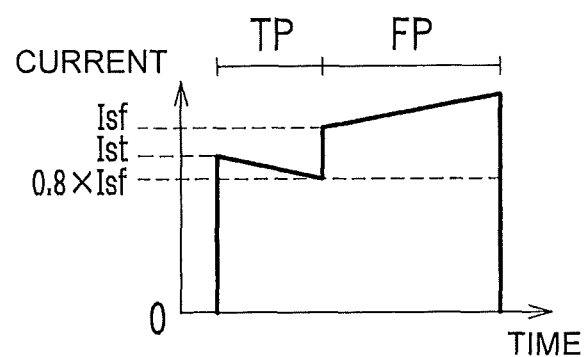
FIG. 10F is a view schematically illustrating an example of the current application pattern.

Further, in the current application pattern illustrated in FIG. 10F, in the penetration step, downslope current application in which the current value is gradually decreased from the initial current value Ist (>0.8×initial current value Isf) is performed, but in the forming step, upslope current application in which the current value is gradually increased from the initial current value Isf is performed.

Figure 10G:
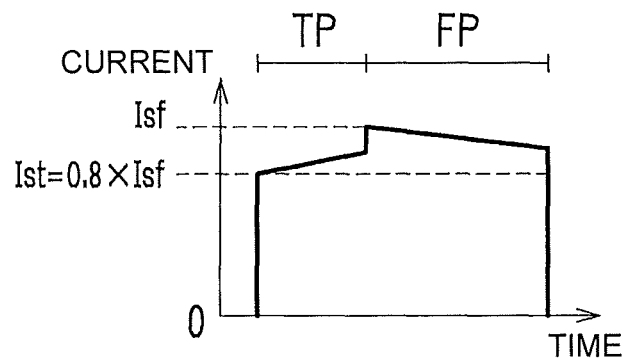
FIG. 10G is a view schematically illustrating an example of the current application pattern.

Further, in the current application pattern illustrated in FIG. 10G, conversely to the current application pattern illustrated in FIG. 10F, in the penetration step, upslope current application in which the current value is gradually increased from the initial current value Ist (=0.8×initial current value Isf) is performed, but in the forming step, downslope current application in which the current value is gradually decreased from the initial current value Isf is performed.

Figure 10H:
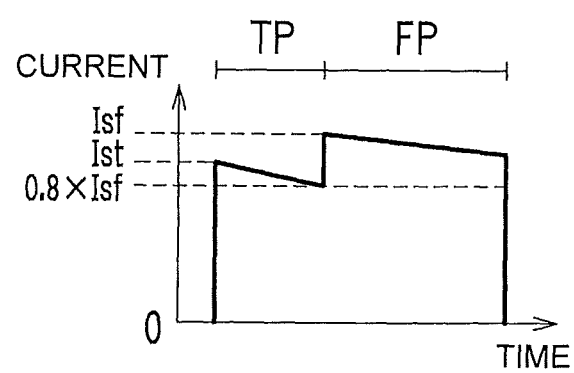
FIG. 10H is a view schematically illustrating an example of the current application pattern.

Further, in the current application pattern illustrated in FIG. 10H, conversely to the current application pattern illustrated in FIG. 10E, in the penetration step, downslope current application in which the current value is gradually decreased from the initial current value Ist (>0.8×initial current value Ist) is performed. Also in the forming step, downslope current application in which the current value is gradually decreased from the initial current value Isf is performed.

Figure 10I:
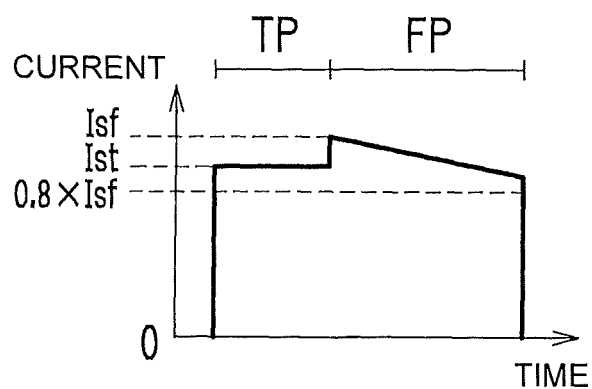
FIG. 10I is a view schematically illustrating an example of the current application pattern.

Further, in the current application pattern illustrated in FIG. 10I, in the penetration step, current application is performed at the initial current value Ist (>0.8×initial current value Isf) without changing the current value, but in the forming step, downslope current application in which the current value is gradually decreased from the initial current value Isf is performed. A high current value is preferable in an early stage in the formation of the nugget 40 in the forming step. In the current application pattern, it is possible to restrain the nugget 40 from being formed poorly, due to the initial current value Isf set to be relatively high, and it is also possible to restrain a large amount of the molten aluminum 1' from spouting out in a later stage of the forming step, due to a temperature decrease along with the downslope current application. As such, in combination of the restraint of the spout of a large amount of the molten aluminum 1' in the later stage of the forming step and the execution of the air blow, it is possible to restrain the nugget 40 from being formed poorly and to further restrain the occurrence of the burr B.

Figure 10J:
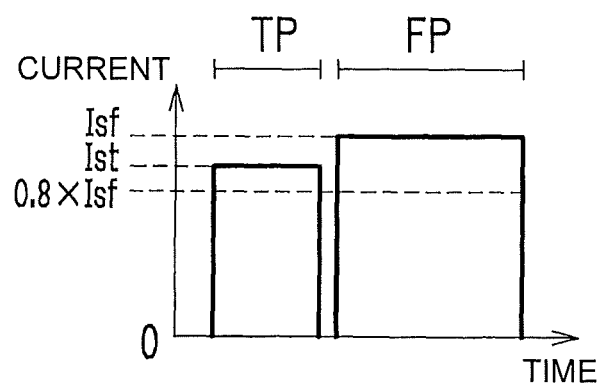
FIG. 10J is a view schematically illustrating an example of the current application pattern.

Further, in the current application pattern illustrated in FIG. 10J, in the penetration step, current application is performed at the initial current value Ist (>0.8×initial current value Isf) without changing the current value, and after a pause (the current application is stopped), current application is performed at the initial current value Isf without changing the current value in the forming step. When such a pause is taken between the penetration step and the forming step, the temperatures of the rivet and the aluminum plate 1 fall once, thereby making it possible to restrain a large amount of the molten aluminum 1' from spouting out. Note that, in the current application patterns illustrated in FIG. 8D, FIG. 9, and FIGS. 10A to 10I, a pause may be taken between the penetration step and the forming step.

Fourth Embodiment

The present embodiment is different from the modification of the first embodiment in that the air is blown from two or more directions. The following mainly describes points different from the modification of the first embodiment.

Figure 11A:
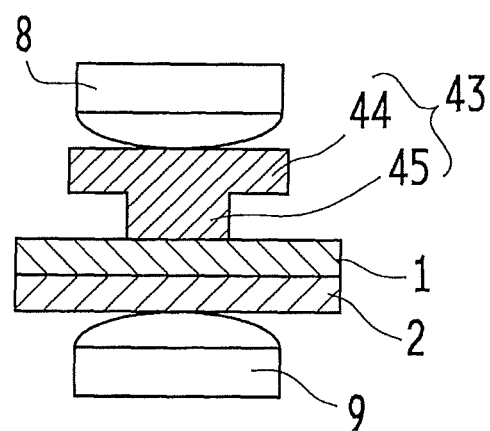
FIG. 11A is a view to schematically describe a sandwiching step in a different material joining method according to a fourth embodiment of the disclosure.
Figure 11B:
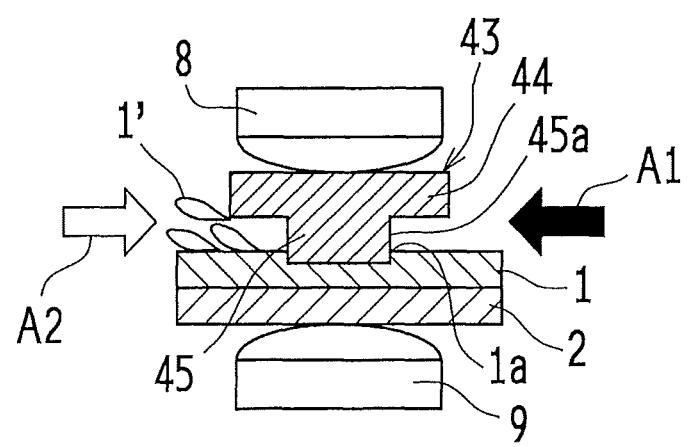
FIG. 11B is a view to schematically describe a penetration step in the different material joining method.
Figure 11C:
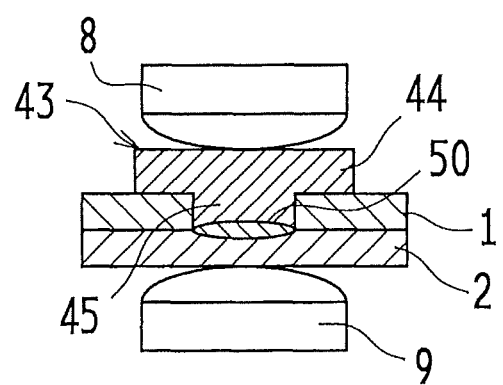
FIG. 11C is a view to schematically describe a forming step in the different material joining method.

FIG. 11A is a view to schematically describe a sandwiching step in a different material joining method according to the present embodiment, FIG. 11B is a view to schematically describe a penetration step, and FIG. 11C is a view to schematically describe a forming step. As illustrated in FIGS. 11A to 11C, in this different material joining method, a plurality of metal members including a dissimilar metal member is joined by resistance welding by use of a rivet 43, similarly to the modification of the first embodiment. Further, in the penetration step, pressurization and current application is performed while the air is blown to a side face 45a of a shank 45 so that the air hits the region around the boundary 1a between the shank 45 and the aluminum plate 1, and this is also similar to the modification of the first embodiment. Note that the rivet 43 is similar to the rivet 3G in FIG. 3G.

In the different material joining method, the rivet 43, the aluminum plate (the first metal member) 1, the iron plate (the nth metal member) 2, and the first and second electrodes 8, 9 are prepared. The rivet 43 having a T-shaped section and including a disk-shaped head 44 and the columnar shank 45 is prepared as the rivet 43 as illustrated in FIG. 11A.

First, in the sandwiching step, as illustrated in FIG. 11A, the rivet 43, the aluminum plate 1, and the iron plate 2 are sandwiched between the first electrode 8 and the second electrode 9 of the resistance spot welder so that the head 44, the shank 45, the aluminum plate 1, and the iron plate 2 are arranged in this order.

Figure 19:
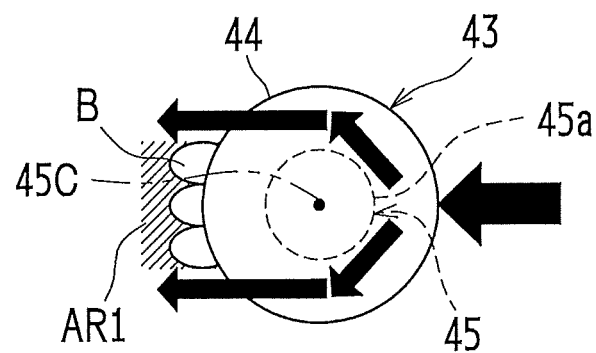
FIG. 19 is a view schematically illustrating the air blow from one direction.

Next will be described the penetration step. As indicated by a black arrow in FIG. 19, when the air is blown to the side face 45a of the shank 45 from one direction, the air is split as indicated by black small arrows, so that the molten aluminum 1' caused in parts other than a part directly blown with the air can be also blown off. Even if the air is split as indicated by the black small arrows, a region AR1 (see a dot-hatching part in FIG. 19) that is not hit by the air might be caused on a side opposite from an air-blown side across the shank 45, and in this case, the burr B is highly frequently formed in the region AR1.

In view of this, in the different material joining method of the present embodiment, the air is blown from two or more directions in the penetration step. More specifically, in the penetration step, as illustrated in FIG. 11B, the rivet 43, the aluminum plate 1, and the iron plate 2 are subjected to pressurization and current application in such a manner that the first electrode 8 and the second electrode 9 are made come close to each other so that a welding pressure is applied to the head 44 of the rivet 43 and the iron plate 2, and a pulse current is applied between the first and second electrodes 8, 9, and hereby, the aluminum plate 1 is melted by generated Joule heat so that the shank 45 penetrates through the aluminum plate 1. At this time, the pressurization and current application is performed while first air A1 is blown to the side face 45a of the shank 45 so that the air hits the region around the boundary 1a between the shank 45 and the aluminum plate 1 as indicated by a black arrow in FIG. 11B, and second air A2 is blown to the side face 45a of the shank 45 from a direction different from that of the first air A1 as indicated by a white arrow in FIG. 11B.

Figure 20:
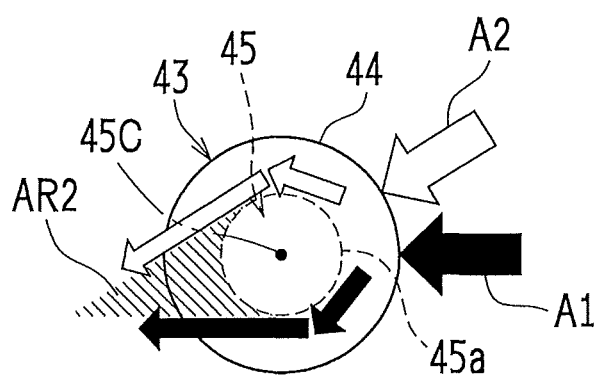
FIG. 20 is a view schematically illustrating the air blow from two directions.

Here, as illustrated in FIG. 20, in a case where an angle formed between the first air A1 blown toward an axial center 45C of the shank 45 and the second air A2 blown toward the axial center 45C is relatively small when the shank 45 is viewed along its axial direction, even when the first air A1 flows as indicated by black small arrows in FIG. 20 and the second air A2 flows as indicated by white small arrows in FIG. 20, a region AR2 (see a dot-hatching part in FIG. 20) that is not hit by the air is also formed.

In view of this, in the different material joining method of the present embodiment, the air is blown from two or more directions in the penetration step, so that the regions AR1, AR2 that are not hit by the air are not formed around the boundary 1a between the shank 45 and the aluminum plate 1. More specifically, in the penetration step, the first air A1 is blown toward the axial center 45C of the shank 45, and the second air A2 is blown toward the axial center 45C of the shank 45 from a direction having an angle of not less than 30 degrees but not more than 330 degrees from a blowing direction of the first air A1 when the shank 45 is viewed along the axial direction.

Figure 12:
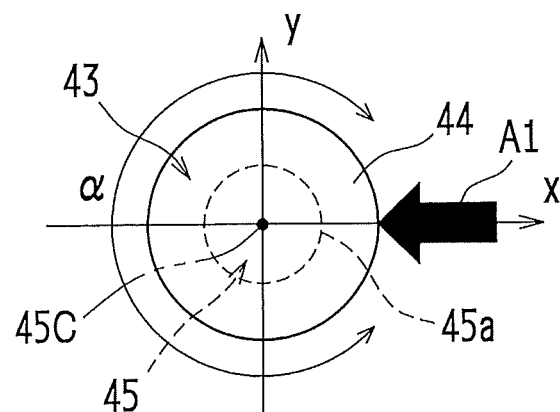
FIG. 12 is a view to schematically describe an air blowing direction.

More specifically, in a case where the xy-coordinates are set with the axial center 45C of the shank 45 being taken as an origin as illustrated in FIG. 12, the first air A1 blown toward the axial center 45C of the shank 45 is fixed on the x-axis, and the second air A2 is blown toward the axial center 45C of the shank 45 from a range of an angle $\alpha$ ($30° \leq \alpha \leq 330°$).

Figure 13A:
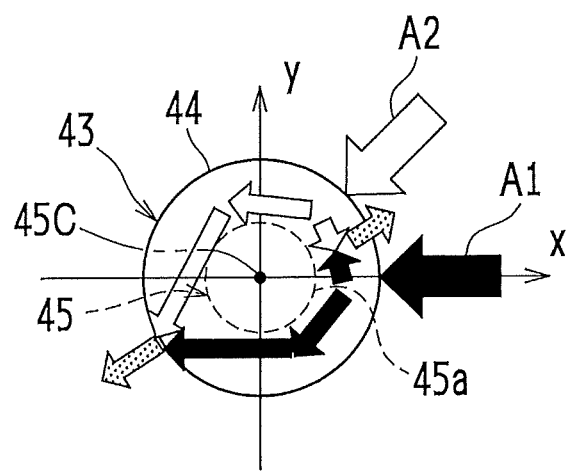
FIG. 13A is a view schematically illustrating an example of air blow.
Figure 13B:
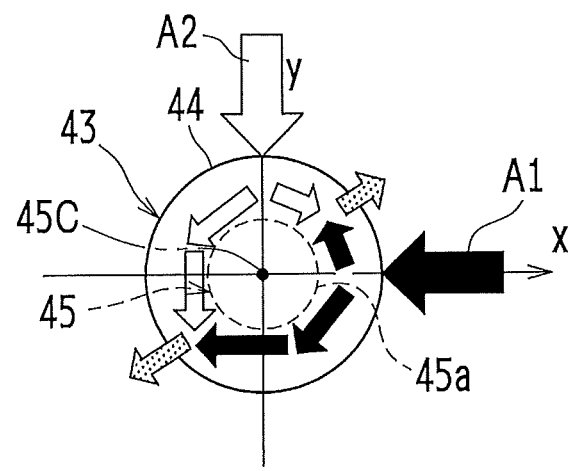
FIG. 13B is a view schematically illustrating an example of the air blow.
Figure 13C:
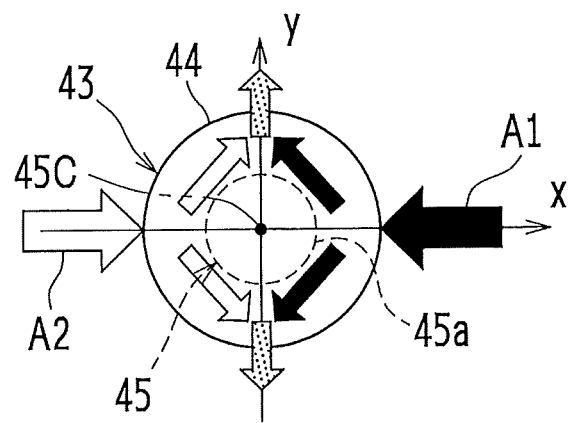
FIG. 13C is a view schematically illustrating an example of the air blow.

FIGS. 13A to 13C are views schematically illustrating examples of the air blow. For example, as illustrated in FIG. 13A, the first air A1 blown toward the axial center 45C of the shank 45 is fixed on the x-axis, and the second air A2 is blown toward the axial center 45C of the shank 45 from a direction of the angle $\alpha=45°$. As a result, the first air A1 flowing as indicated by black small arrows in FIG. 13A and the second air A2 flowing as indicated by white small arrows in FIG. 13A join each other at an angle of about 22.5° and at an angle of about 200.5°, as indicated by dot arrows in FIG. 13A.

Further, as illustrated in FIG. 13B, the first air A1 blown toward the axial center 45C of the shank 45 is fixed on the x-axis, and the second air A2 is blown toward the axial center 45C of the shank 45 from a direction of the angle $\alpha=90°$. As a result, the first air A1 flowing as indicated by black small arrows in FIG. 13B and the second air A2 flowing as indicated by white small arrows in FIG. 13B join each other at an angle of about 45° and at an angle of about 225°, as indicated by dot arrows in FIG. 13B.

Further, as illustrated in FIG. 13C, the first air A1 blown toward the axial center 45C of the shank 45 is fixed on the x-axis, and the second air A2 is blown toward the axial center 45C of the shank 45 from a direction of the angle $\alpha=180°$. As a result, the first air A1 flowing as indicated by black small arrows in FIG. 13C and the second air A2 flowing as indicated by white small arrows in FIG. 13C join each other at an angle of about 60° and at an angle of about 270°, as indicated by dot arrows in FIG. 13C.

When the first air A1 blown toward the axial center 45C of the shank 45 is fixed on the x-axis and the second air A2 is blown toward the axial center 45C of the shank 45 from the range of the angle $\alpha(30° \leq \alpha \leq 330°)$ as such, the regions AR1, AR2 that are not hit by the air are not formed around the boundary 1a between the shank 45 and the aluminum plate 1 in any of the cases of FIGS. 13A to 13C. Accordingly, the molten aluminum 1' spouting out from the boundary 1a in the penetration step can be surely blown off.

Then, in the subsequent forming step, as illustrated in FIG. 11C, the rivet 43, the aluminum plate 1, and the iron plate 2 are subjected to pressurization and current application by the first and second electrodes 8, 9 so as to melt the shank 45 and the iron plate 2 by generate Joule heat so that a nugget 50 is formed between the shank 45 and the iron plate 2. Hereby, joining is finished.

As described above, in the different material joining method of the present embodiment, with a simple configuration in which the airs A1, A2 are blown from two or more directions so as not to form the regions AR1, AR2 that are not hit by the air, it is possible to restrain the occurrence of the burr B in the joining portion.

Note that the rivet used in the different material joining method of the present embodiment is not limited to the rivet 43, and the rivets 3A, 3B, 3C, 3D, 3E, 3F, 3H illustrated in FIGS. 3A to 3F and FIG. 3H and the rivets 13A, 13B, 13C, 13D illustrated in FIGS. 7A to 7D can be used.

Further, in the present embodiment, the air blow in the forming step may be also performed appropriately depending on a required joining strength and the like.

First Modification

The present modification is different from the fourth embodiment in that the second air A2 is not blown toward the axial center 45C of the shank 45. The following mainly describes points different from the fourth embodiment.

Figure 14A:
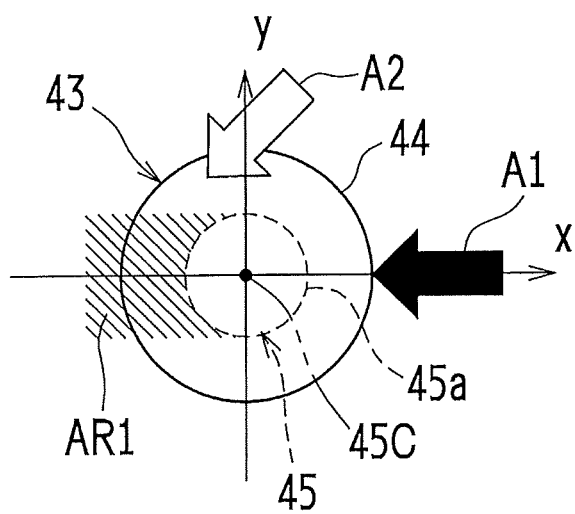
FIG. 14A is a view schematically illustrating an example of air blow according to a first modification of the fourth embodiment.
Figure 14B:
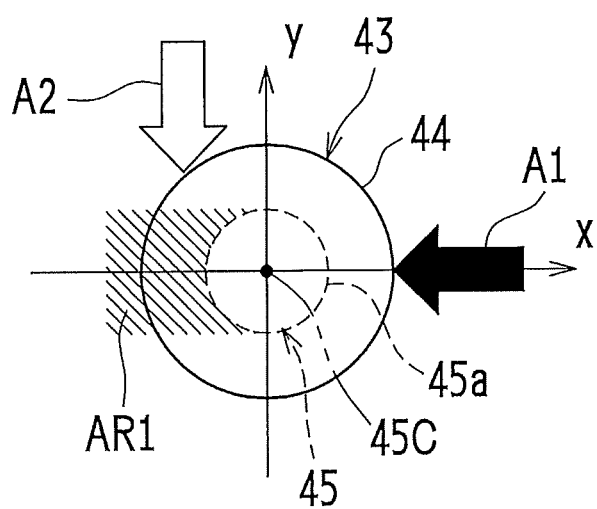
FIG. 14B is a view schematically illustrating an example of the air blow according to the first modification.
Figure 14C:
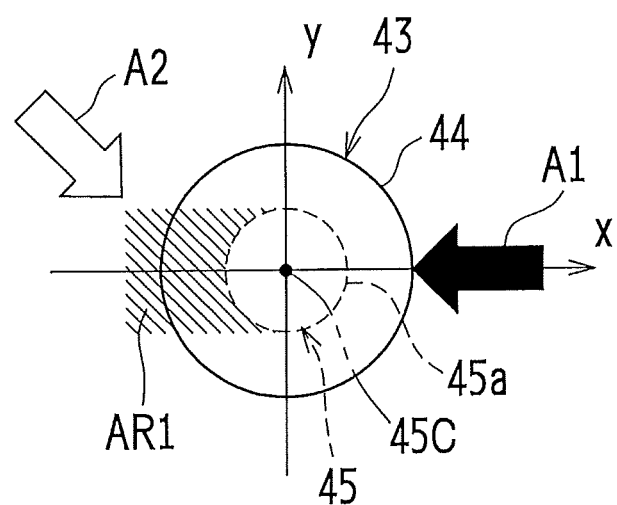
FIG. 14C is a view schematically illustrating an example of the air blow according to the first modification.

FIGS. 14A to 14C are views schematically illustrating examples of the air blow according to the present modification. In the different material joining method of the present modification, as illustrated in FIGS. 14A to 14C, in the penetration step, the first air A1 is blown toward the axial center 45C of the shank 45, and the second air A2 is blown toward the region AR1 that is not hit by the first air A1 when the shank 45 is viewed along the axial direction.

More specifically, as illustrated in FIGS. 14A to 14C, in a case where the xy-coordinates are set with the axial center 45C of the shank 45 being taken as an origin, the first air A1 blown toward the axial center 45C of the shank 45 is fixed on the x-axis, and the second air A2 is blown toward the region AR1 that is not hit by the first air A1, the region AR1 being formed on the side opposite from the air-blown side across the shank 45. Note that the second air A2 may be blown from a direction of 45° as illustrated in FIG. 14A, the second air A2 may be blown from a direction of 90° as illustrated in FIG. 14B, or the second air A2 may be blown from a direction of 135° as illustrated in FIG. 14C.

As such, in the different material joining method of the present modification, the second air A2 is blown toward the region AR1 that is not hit by the first air A1 in a pinpoint manner, so that the molten aluminum 1' can be surely blown off, thereby making it possible to further restrain the occurrence of the burr B in the joining portion.

Second Modification

The present modification is different from the fourth embodiment in that the air is blown from three directions. The following mainly describes points different from the fourth embodiment.

Figure 15A:
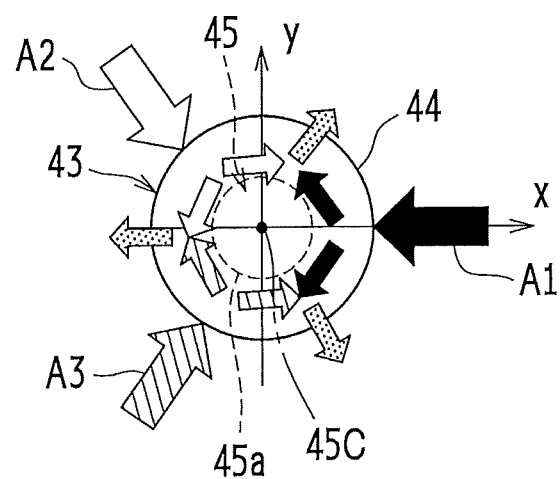
FIG. 15A is a view schematically illustrating an example of air blow according to a second modification of the fourth embodiment.
Figure 15B:
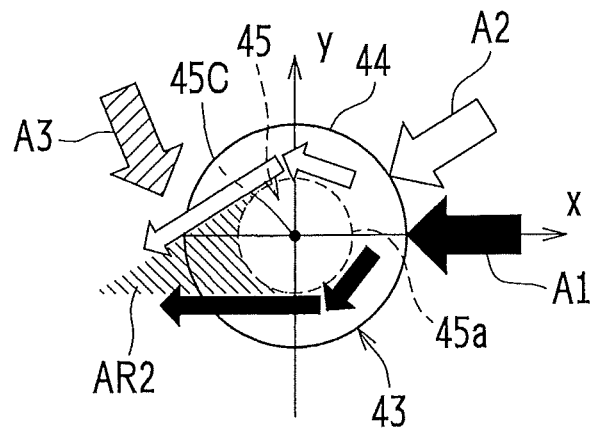
FIG. 15B is a view schematically illustrating an example of the air blow according to the second modification.

FIGS. 15A and 15B are views schematically illustrating examples of the air blow according to the second modification of the fourth embodiment. In the different material joining method of the present modification, as illustrated in FIGS. 15A and 15B, in the penetration step, third air A3 is blown in addition to the first air A1 and the second air A2.

More specifically, as illustrated in FIG. 15A, in a case where the xy-coordinates are set with the axial center 45C of the shank 45 being taken as an origin, the first air A1 blown toward the axial center 45C of the shank 45 is fixed on the x-axis, and the second air A2 is blown toward the axial center 45C of the shank 45 from a direction of the angle α=135°. In addition to them, the third air A3 is blown toward the axial center 45C of the shank 45 from a direction of the angle α=225°, as indicated by a hatching arrow in FIG. 15A. As a result, the first air A1 flowing as indicated by a black small arrow in FIG. 15A and the second air A2 flowing as indicated by a white small arrow in FIG. 15A join each other at an angle of 45° as indicated by a dot arrow in FIG. 15A. Further, the second air A2 flowing as indicated by a white small arrow in FIG. 15A and the third air A3 flowing as indicated by a hatching small arrow in FIG. 15A join each other at an angle of 180° as indicated by a dot arrow in FIG. 15A. Further, the third air A3 flowing as indicated by a hatching small arrow in FIG. 15A and the first air A1 flowing as indicated by a black small arrow in FIG. 15A join each other at an angle of 315°.

As such, when the first air A1 blown toward the axial center 45C of the shank 45 is fixed on the x-axis and the second air A2 and the third air A3 are blown toward the axial center 45C of the shank 45 from a range of the angle α (30°≤α≤330°), the region AR1 that is not hit by the air is not formed around the boundary 1a between the shank 45 and the aluminum plate 1. Accordingly, the molten aluminum 1' spouting out from the boundary 1a in the penetration step can be more surely blown off.

Further, as illustrated in FIG. 15B, in a case where the xy-coordinates are set with the axial center 45C of the shank 45 being taken as an origin, the first air A1 blown toward the axial center 45C of the shank 45 is fixed on the x-axis, and the second air A2 is blown toward the axial center 45C of the shank 45 from a direction of the angle α (α<30°). As a result, the region AR2 that is not hit by the air even when the first air A1 flows as indicated by black small arrows in FIG. 15B and the second air A2 flows as indicated by white small arrows in FIG. 15B is formed, but the third air A3 is blown to the region AR2.

Thus, the third air A3 is blown toward the region AR2 that is not hit by the first air A1 and the second air A2 in a pinpoint manner, so that the molten aluminum 1' can be more surely blown off, thereby making it possible to further restrain the occurrence of the burr B in the joining portion.

Other Embodiments

The disclosure is not limited to the above embodiments and can be carried out in other various forms without departing from the spirit or main feature of the disclosure.

In the above embodiments, two metal members (the aluminum plate 1 and the iron plate 2) are joined. However, the disclosure is not limited to this, and three or more metal members may be joined.

Further, in the above embodiments, the aluminum plate 1 is joined to the iron plate 2. However, the disclosure is not limited to this, provided that a plurality of metal members including a dissimilar metal member is joined. For example, two aluminum plates 1 and one iron plate 2 may be joined to each other, a metal plate made of metal other than aluminum and iron, the aluminum plate 1, and the iron plate 2 may be joined to each other, or a plurality of types of metal plates other than aluminum and iron may be joined to each other.

Further, in the second embodiment, as a rivet in which the volume Vg of the annular groove 17, 27 is set to be smaller than the volume Vp of the pilot portion 15', 25' of the shank 15, 25, the rivet 13 in which the projection height of the annular wall 16 is set to be relatively low and the rivet 23 in which the diameter of the head 24 is made small (the groove width of the annular groove 27 is narrowed) are illustrated. However, the disclosure is not limited to this, and a rivet in which the projection height of an annular wall is set to be relatively low and the groove width of an annular groove is narrowed may be employed, for example.

Further, the fourth embodiment and its modifications exemplify cases where the air blow is performed from two directions and three directions. However, the disclosure is not limited to this, and the air blow may be performed from four or more directions.

Further, the second to fourth embodiments are not irrelevant to each other but can be combined appropriately. More specifically, any two embodiments from the second to fourth embodiments may be combined with each other, or all of the second to fourth embodiments may be combined with each other.

Thus, the above embodiments are just examples in every respect and must not be interpreted restrictively. Further, modifications and alterations belonging to an equivalent range of Claims are all included in the disclosure.

With the disclosure, it is possible to restrain the occurrence of a burr in a joining portion without upsizing a rivet, and thus, the disclosure is extremely useful when the disclosure is applied to a different material joining method for joining dissimilar metal members by resistance welding by use of a rivet.

What is claimed is:

1. A different material joining method for joining a plurality of metal members by resistance welding by use of a rivet, the different material joining method comprising:
   preparing a metal rivet including a head and a shank, first to nth metal members, and first and second electrodes, n being an integer of 2 or more, the first metal member being made of a material different from at least one of the second to nth metal members;
   a sandwiching step of sandwiching, between the first electrode and the second electrode, the rivet and the first to nth metal members arranged in order of the head, the shank, and the first to nth metal members;
   a penetration step of performing pressurization and current application on the rivet and the first to nth metal members by the first and second electrodes so that the shank penetrates through the first to (n−1)th metal members; and
   a forming step of performing pressurization and current application on the rivet and the first to nth metal members by the first and second electrodes so that a nugget is formed between the shank and the nth metal member,
   wherein, in the penetration step, the pressurization and current application is performed while air is blown to a side face of the shank so that the air hits a region around a boundary between the shank and the first metal member so as to blow off molten metal of the first metal member replaced with the shank spouting out from the boundary between the shank and the first metal member.

2. The different material joining method according to claim wherein, in the forming step, the pressurization and current application is performed while the air is blown to a side face of the head so that the air hits a region around a boundary between the head and the first metal member.

3. The different material joining method according to claim 1, wherein:
   the rivet is configured such that the head includes an annular wall projecting in a same direction as the shank so that an annular groove is formed around the shank, and a volume of the annular groove is smaller than a volume of a pilot portion of the shank, the pilot portion projecting from the annular wall; and
   at least in the penetration step, an air flow rate is controlled so that molten metal is filled into the annular groove.

4. The different material joining method according to claim 3, wherein a projection height of the annular wall is lower than a length of the shank.

5. The different material joining method according to claim 1, wherein a first initial current value at a time when the pressurization and current application is started in the penetration step is not less than 0.8 times a second initial current value at a time when the pressurization and current application is started in the forming step.

6. The different material joining method according to claim 5, wherein, in the forming step, downslope current application in which a current value is gradually decreased from the second initial current value is performed.

7. The different material joining method according to claim 5, wherein the current value in the pressurization and current application in the penetration step is not less than the current value in the pressurization and current application in the forming step.

8. The different material joining method according to claim 1, wherein, in the penetration step, the air is blown from two or more directions so as not to form a region that is not hit by the air around the boundary between the shank and the first metal member.

9. The different material joining method according to claim 8, wherein, in the penetration step, first air is blown toward an axial center of the shank, and second air is blown toward the axial center of the shank from the direction having an angle of not less than 30 degrees but not more than 330 degrees from a blowing direction of the first air when the shank is viewed along an axial direction of the shank.

10. The different material joining method according to claim 8, wherein, in the penetration step, first air is blown toward an axial center of the shank, and second air is blown toward the region that is not hit by the first air when the shank is viewed along an axial direction of the shank.

11. The different material joining method according to claim 1, wherein, in the penetration step, the air is blown from a direction parallel to a plane perpendicular to the shank.

12. The different material joining method according to claim 1, wherein, in the penetration step, the air is blown from a direction inclined from a plane perpendicular to the shank.

* * * * *